US012063683B2

(12) United States Patent
Zewail et al.

(10) Patent No.: US 12,063,683 B2
(45) Date of Patent: Aug. 13, 2024

(54) MODULATION AND CODING SCHEMES FOR HIGH BAND WIRELESS COMMUNICATIONS

(71) Applicant: QUALCOMM Incorporated, San Diego, CA (US)

(72) Inventors: Ahmed Abdelaziz Ibrahim Abdelaziz Zewail, San Diego, CA (US); Xiaoxia Zhang, San Diego, CA (US); Tao Luo, San Diego, CA (US); Zhifei Fan, San Diego, CA (US); Jing Sun, San Diego, CA (US); Wooseok Nam, San Diego, CA (US); Mehmet Izzet Gurelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 17/326,291

(22) Filed: May 20, 2021

(65) Prior Publication Data
US 2021/0368539 A1    Nov. 25, 2021

Related U.S. Application Data

(60) Provisional application No. 63/029,538, filed on May 24, 2020.

(51) Int. Cl.
*H04W 74/00* (2009.01)
*H04L 1/00* (2006.01)
(Continued)

(52) U.S. Cl.
CPC ......... *H04W 74/008* (2013.01); *H04L 1/0003* (2013.01); *H04L 1/0009* (2013.01);
(Continued)

(58) Field of Classification Search
None
See application file for complete search history.

(56) References Cited

U.S. PATENT DOCUMENTS

| 10,291,378 B1 | 5/2019 | Bai et al. |
| 2014/0169297 A1 * | 6/2014 | Kim ................. H04W 72/1273 370/329 |

(Continued)

FOREIGN PATENT DOCUMENTS

| WO | WO-2018023086 A1 * | 2/2018 | ........... H04B 7/0695 |
| WO | WO-2018171792 A1 | 9/2018 | |
| WO | WO-2021219690 A1 * | 11/2021 | .......... H04W 52/281 |

OTHER PUBLICATIONS

International Search Report and Written Opinion—PCT/US2021/033572—ISA/EPO—Aug. 31, 2021.

*Primary Examiner* — Anh Vu H Ly
(74) *Attorney, Agent, or Firm* — Holland & Hart LLP

(57) ABSTRACT

Methods, systems, and devices for wireless communications are described in which a user equipment (UE) may transmit a random access message (e.g., msgA or msg3) using a modulation and coding scheme (MCS) selected based on the frequency band and subcarrier spacing utilized for the random access procedure. The MCS may depend on the frequency band and a size of the SCS satisfying a threshold. In some cases, a base station may select and indicate the MCS for the UE. Additionally or alternatively, a phase tracking reference signal may be transmitted along with a random access message to correct for phase noise.

23 Claims, 23 Drawing Sheets

(51) Int. Cl.
*H04W 56/00* (2009.01)
*H04W 72/23* (2023.01)
*H04W 74/0833* (2024.01)

(52) U.S. Cl.
CPC ......... *H04L 1/0016* (2013.01); *H04W 56/001* (2013.01); *H04W 72/23* (2023.01); *H04W 74/0833* (2013.01)

(56) References Cited

U.S. PATENT DOCUMENTS

| | | | |
|---|---|---|---|
| 2018/0160453 A1* | 6/2018 | Lee | H04W 48/12 |
| 2019/0159257 A1 | 5/2019 | Rico Alvarino et al. | |
| 2020/0037191 A1 | 1/2020 | Jang et al. | |
| 2020/0037197 A1* | 1/2020 | Cho | H04W 28/0263 |
| 2020/0351955 A1* | 11/2020 | Jeon | H04L 1/1642 |
| 2021/0359807 A1* | 11/2021 | Zewail | H04L 5/0094 |
| 2021/0385856 A1* | 12/2021 | Irukulapati | H04W 72/14 |
| 2022/0159634 A1* | 5/2022 | Rastegardoost | H04L 5/0053 |
| 2022/0263698 A1* | 8/2022 | Harada | H04L 1/0002 |

\* cited by examiner

MODULATION AND CODING SCHEMES FOR HIGH BAND WIRELESS COMMUNICATIONS

CROSS REFERENCE

The present Application for Patent claims the benefit of U.S. Provisional Patent Application No. 63/029,538 by ZEWAIL et al., entitled "MODULATION AND CODING SCHEMES FOR HIGH BAND WIRELESS COMMUNICATIONS," filed May 24, 2020, assigned to the assignee hereof, and expressly incorporated by reference herein.

INTRODUCTION

The following relates generally to wireless communications and more specifically to techniques for managing modulation and coding schemes (MCSs) in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a UE is described. The method may include receiving, from a base station, an indication of an MCS for a random access message of a random access procedure based on a frequency band for the random access procedure and a subcarrier spacing (SCS) associated with the frequency band. The method may further include transmitting the random access message to the base station via a random access channel (RACH) of the frequency band in accordance with the SCS and the MCS.

An apparatus for wireless communications at a UE is described. The apparatus may include a processor; and memory coupled to the processor, the processor and memory configured to receive, from a base station, an indication of an MCS for a random access message of a random access procedure based on a frequency band for the random access procedure and an SCS associated with the frequency band. The processor and memory may be further configured to transmit the random access message to the base station via a RACH of the frequency band in accordance with the SCS and the MCS.

Another apparatus for wireless communications at a UE is described. The apparatus may include means for receiving, from a base station, an indication of an MCS for a random access message of a random access procedure based on a frequency band for the random access procedure and an SCS associated with the frequency band. The apparatus may further include means for transmitting the random access message to the base station via a RACH of the frequency band in accordance with the SCS and the MCS.

A non-transitory computer-readable medium storing code for wireless communications at a UE is described. The code may include instructions executable by a processor to receive, from a base station, an indication of an MCS for a random access message of a random access procedure based on a frequency band for the random access procedure and an SCS associated with the frequency band. The code may further include instructions executable by the processor to transmit the random access message to the base station via a RACH of the frequency band in accordance with the SCS and the MCS.

Some examples of the method, apparatuses, and non-transitory computer-readable medium described herein may further include operations, features, means, or instructions for selecting an MCS table from a set of MCS tables based on the frequency band and the SCS associated with the frequency band, where the MCS for the random access message may be selected from the MCS table.

In some examples of the method, apparatuses, and non-transitory computer-readable medium described herein, the MCS table includes a set of MCSs having lower modulation orders relative to all other MCS tables of the set of MCS tables.

Some examples of the method, apparatuses, and non-transitory computer-readable medium described herein may further include operations, features, means, or instructions for receiving an uplink grant that includes a set of bits for conveying the indication of the MCS, where the set of bits includes at least one reserved bit independent of conveying the indication of the MCS.

In some examples of the method, apparatuses, and non-transitory computer-readable medium described herein, the at least one reserved bit may be associated with demodulation reference signal (DMRS) multiplexing for the random access message.

In some examples of the method, apparatuses, and non-transitory computer-readable medium described herein, the at least one reserved bit corresponds to a transport block size scaling value for the random access message.

In some examples of the method, apparatuses, and non-transitory computer-readable medium described herein, the MCS satisfies a threshold MCS that may be based on the frequency band and the SCS associated with the frequency band.

In some examples of the method, apparatuses, and non-transitory computer-readable medium described herein, the threshold MCS includes one of a Quadrature Phase Shift Keying (QPSK) modulation or a 16 Quadrature Amplitude Modulation (QAM).

Some examples of the method, apparatuses, and non-transitory computer-readable medium described herein may further include operations, features, means, or instructions for transmitting, to the base station, an indication of a UE preference for a reference signal configuration for phase tracking based on the MCS.

Some examples of the method, apparatuses, and non-transitory computer-readable medium described herein may further include operations, features, means, or instructions for transmitting one or more phase tracking reference signals in accordance with the reference signal configuration, where the one or more phase tracking reference signals may be transmitted with the random access message.

Some examples of the method, apparatuses, and non-transitory computer-readable medium described herein may further include operations, features, means, or instructions for selecting the MCS based on the reference signal configuration.

Some examples of the method, apparatuses, and non-transitory computer-readable medium described herein may further include operations, features, means, or instructions for transmitting a random access preamble during a random access occasion based on the UE preference for the reference signal configuration.

Some examples of the method, apparatuses, and non-transitory computer-readable medium described herein may further include operations, features, means, or instructions for receiving an association between a set of random access preambles, a set of random access occasions, and a set of reference signal configurations and selecting the random access preamble and the random access occasion based on a second reference signal configuration of the set of reference signal configurations corresponding to the reference signal configuration and the association.

A method for wireless communications at a base station is described. The method may include transmitting an indication of an MCS for a random access message of a random access procedure based on a frequency band for the random access procedure and an SCS associated with the frequency band. The method may further include receiving, from the UE, the random access message based on the MCS.

An apparatus for wireless communications at a base station is described. The apparatus may include a processor; and memory coupled to the processor, the processor and memory configured to transmit an indication of an MCS for a random access message of a random access procedure based on a frequency band for the random access procedure and an SCS associated with the frequency band. The processor and memory may be further configured to receive, from the UE, the random access message based on the MCS.

Another apparatus for wireless communications at a base station is described. The apparatus may include means for transmitting an indication of an MCS for a random access message of a random access procedure based on a frequency band for the random access procedure and an SCS associated with the frequency band. The apparatus may further include means for receiving, from the UE, the random access message based on the MCS.

A non-transitory computer-readable medium storing code for wireless communications at a base station is described. The code may include instructions executable by a processor to transmit an indication of an MCS for a random access message of a random access procedure based on a frequency band for the random access procedure and an SCS associated with the frequency band. The code may further include instructions executable by the processor to receive, from the UE, the random access message based on the MCS.

Some examples of the method, apparatuses, and non-transitory computer-readable medium described herein may further include operations, features, means, or instructions for receiving, in response to the indication of the MCS, the random access message via a RACH of the frequency band in accordance with the SCS and the MCS.

Some examples of the method, apparatuses, and non-transitory computer-readable medium described herein may further include operations, features, means, or instructions for transmitting an uplink grant that includes a set of bits for conveying the indication of the MCS, where the set of bits includes at least one reserved bit independent of conveying the indication of the MCS.

In some examples of the method, apparatuses, and non-transitory computer-readable medium described herein, the at least one reserved bit may be associated with DMRS multiplexing for the random access message.

In some examples of the method, apparatuses, and non-transitory computer-readable medium described herein, the at least one reserved bit corresponds to a transport block size scaling value for the random access message.

In some examples of the method, apparatuses, and non-transitory computer-readable medium described herein, the MCS satisfies a threshold MCS that may be based on the frequency band and the SCS associated with the frequency band.

In some examples of the method, apparatuses, and non-transitory computer-readable medium described herein, the threshold MCS includes one of a QPSK modulation or a 16 QAM.

Some examples of the method, apparatuses, and non-transitory computer-readable medium described herein may further include operations, features, means, or instructions for transmitting, to the UE, an association between a set of random access preambles, a set of random access occasions, and a set of reference signal configurations, receiving the random access message from the UE in accordance with a random access preamble via a random access occasion based on the association, and selecting a reference signal configuration from the set of reference signal configurations based on the random access preamble and the random access occasion.

Some examples of the method, apparatuses, and non-transitory computer-readable medium described herein may further include operations, features, means, or instructions for receiving an indication of a UE preference for a reference signal configuration for phase tracking based on the MCS and selecting the reference signal configuration for a phase tracking reference signal for the UE from a set of reference signal configurations based on the UE preference.

A method of wireless communications at a UE is described. The method may include determining a frequency band available for a random access procedure between the UE and a base station and determining an SCS associated with the frequency band. The method may further include selecting, from a set of MCSs, an MCS for a random access message of the random access procedure based on the frequency band and the SCS associated with the frequency band and transmitting the random access message to the base station via a RACH of the frequency band in accordance with the SCS and selected MCS.

An apparatus for wireless communications at a UE is described. The apparatus may include a processor; and memory coupled to the processor, the processor and memory configured to determine a frequency band available for a random access procedure between the UE and a base station and determine an SCS associated with the frequency band. The processor and memory may be further configured to select, from a set of MCSs, an MCS for a random access message of the random access procedure based on the frequency band and the SCS associated with the frequency band and transmit the random access message to the base station via a RACH of the frequency band in accordance with the SCS and selected MCS.

Another apparatus for wireless communications at a UE is described. The apparatus may include means for determining a frequency band available for a random access procedure between the UE and a base station and means for determining an SCS associated with the frequency band. The apparatus may further include means for selecting, from a set of MCSs, an MCS for a random access message of the random access procedure based on the frequency band and the SCS associated with the frequency band and means for transmitting the random access message to the base station via a RACH of the frequency band in accordance with the SCS and selected MCS.

A non-transitory computer-readable medium storing code for wireless communications at a UE is described. The code may include instructions executable by a processor to determine a frequency band available for a random access procedure between the UE and a base station and determine an SCS associated with the frequency band. The code may further include instructions executable by the processor to select, from a set of MCSs, an MCS for a random access message of the random access procedure based on the frequency band and the SCS associated with the frequency band and transmit the random access message to the base station via a RACH of the frequency band in accordance with the SCS and selected MCS.

Some examples of the method, apparatuses, and non-transitory computer-readable medium described herein may further include operations, features, means, or instructions for receiving, from the base station, an indication of the MCS to select from the set of MCSs, where the MCS is selected based on the indication.

Some examples of the method, apparatuses, and non-transitory computer-readable medium described herein may further include operations, features, means, or instructions for receiving an uplink grant that includes a set of bits for conveying the indication of the MCS, where the set of bits includes at least one reserved bit independent of conveying the indication of the MCS.

In some examples of the method, apparatuses, and non-transitory computer-readable medium described herein, the at least one reserved bit is associated with DMRS multiplexing for the random access message In some examples of the method, apparatuses, and non-transitory computer-readable medium described herein, the at least one reserved bit corresponds to a transport block size scaling value for the random access message.

Some examples of the method, apparatuses, and non-transitory computer-readable medium described herein may further include operations, features, means, or instructions for determining a threshold MCS based on the frequency band and the SCS associated with the frequency band, where the selected MCS satisfies the threshold MCS.

In some examples of the method, apparatuses, and non-transitory computer-readable medium described herein, the threshold MCS includes one of a QPSK modulation or a 16 QAM.

Some examples of the method, apparatuses, and non-transitory computer-readable medium described herein may further include operations, features, means, or instructions for determining a UE preference for a reference signal configuration for phase tracking based on the selected MCS, and transmitting an indication of the UE preference to the base station.

Some examples of the method, apparatuses, and non-transitory computer-readable medium described herein may further include operations, features, means, or instructions for transmitting one or more phase tracking reference signals in accordance with the reference signal configuration, where the one or more phase tracking reference signals are transmitted with the random access message.

Some examples of the method, apparatuses, and non-transitory computer-readable medium described herein may further include operations, features, means, or instructions for selecting the MCS based on the reference signal configuration.

Some examples of the method, apparatuses, and non-transitory computer-readable medium described herein may further include operations, features, means, or instructions for determining a random access preamble and a random access occasion based on the UE preference for the reference signal configuration.

Some examples of the method, apparatuses, and non-transitory computer-readable medium described herein may further include operations, features, means, or instructions for determining an association between a set of random access preambles, a set of random access occasions, and a set of reference signal configurations, and selecting the random access preamble and the random access occasion based on a second reference signal configuration of the set of reference signal configurations corresponding to the reference signal configuration.

Some examples of the method, apparatuses, and non-transitory computer-readable medium described herein may further include operations, features, means, or instructions for selecting an MCS table from a set of MCS tables based on the frequency band and the SCS associated with the frequency band, where the MCS for the random access message is selected from the MCS table.

In some examples of the method, apparatuses, and non-transitory computer-readable medium described herein, the MCS table includes a set of MCSs having lower modulation orders relative to all other MCS tables of the set of MCS tables.

A method of wireless communications at a base station is described. The method may include determining a frequency band available for a random access procedure between the base station and a UE and determining an SCS associated with the frequency band. The method may further include selecting, from a set of MCSs, an MCS for a random access message of the random access procedure based on the frequency band and the SCS associated with the frequency band and transmitting, to the UE, an indication of the selected MCS for the random access message.

An apparatus for wireless communications at a base station is described. The apparatus may include a processor; and memory coupled to the processor, the processor and memory configured to determine a frequency band available for a random access procedure between the base station and a UE and determine an SCS associated with the frequency band. The processor and memory may be further configured to select, from a set of MCSs, an MCS for a random access message of the random access procedure based on the frequency band and the SCS associated with the frequency band and transmit, to the UE, an indication of the selected MCS for the random access message.

Another apparatus for wireless communications at a base station is described. The apparatus may include means for determining a frequency band available for a random access procedure between the base station and a UE and means for determining an SCS associated with the frequency band. The apparatus may further include means for selecting, from a set of MCSs, an MCS for a random access message of the random access procedure based on the frequency band and the SCS associated with the frequency band and means for transmitting, to the UE, an indication of the selected MCS for the random access message.

A non-transitory computer-readable medium storing code for wireless communications at a base station is described. The code may include instructions executable by a processor to determine a frequency band available for a random access procedure between the base station and a UE and determine an SCS associated with the frequency band. The code may further include instructions executable by the processor to select, from a set of MCSs, an MCS for a random access message of the random access procedure based on the frequency band and the SCS associated with the frequency band and transmit, to the UE, an indication of the selected MCS for the random access message.

Some examples of the method, apparatuses, and non-transitory computer-readable medium described herein may further include operations, features, means, or instructions for receiving, from the UE and in response to the indication of the selected MCS, the random access message via a RACH of the frequency band in accordance with the SCS and selected MCS.

Some examples of the method, apparatuses, and non-transitory computer-readable medium described herein may further include operations, features, means, or instructions for transmitting an uplink grant that includes a set of bits for conveying the indication of the MCS, where the set of bits includes at least one reserved bit independent of conveying the indication of the MCS.

In some examples of the method, apparatuses, and non-transitory computer-readable medium described herein, the at least one reserved bit is associated with DMRS multiplexing for the random access message.

In some examples of the method, apparatuses, and non-transitory computer-readable medium described herein, the at least one reserved bit corresponds to a transport block size scaling value for the random access message.

Some examples of the method, apparatuses, and non-transitory computer-readable medium described herein may further include operations, features, means, or instructions for determining a threshold MCS based on the frequency band and the SCS associated with the frequency band, where the selected MCS satisfies the threshold MCS.

In some examples of the method, apparatuses, and non-transitory computer-readable medium described herein, the threshold MCS includes one of a QPSK modulation or a 16 QAM.

Some examples of the method, apparatuses, and non-transitory computer-readable medium described herein may further include operations, features, means, or instructions for transmitting, to the UE, an association between a set of random access preambles, a set of random access occasions, and a set of reference signal configurations, receiving the random access message from the UE in accordance with a random access preamble via a random access occasion based on the association, and determining a reference signal configuration of the set of reference signal configurations based on the random access preamble and the random access occasion.

Some examples of the method, apparatuses, and non-transitory computer-readable medium described herein may further include operations, features, means, or instructions for receiving an indication of a UE preference for a reference signal configuration for phase tracking based on the selected MCS; and determining the reference signal configuration for a phase tracking reference signal for the UE based on the UE preference.

DETAILED DESCRIPTION

Figure 1:
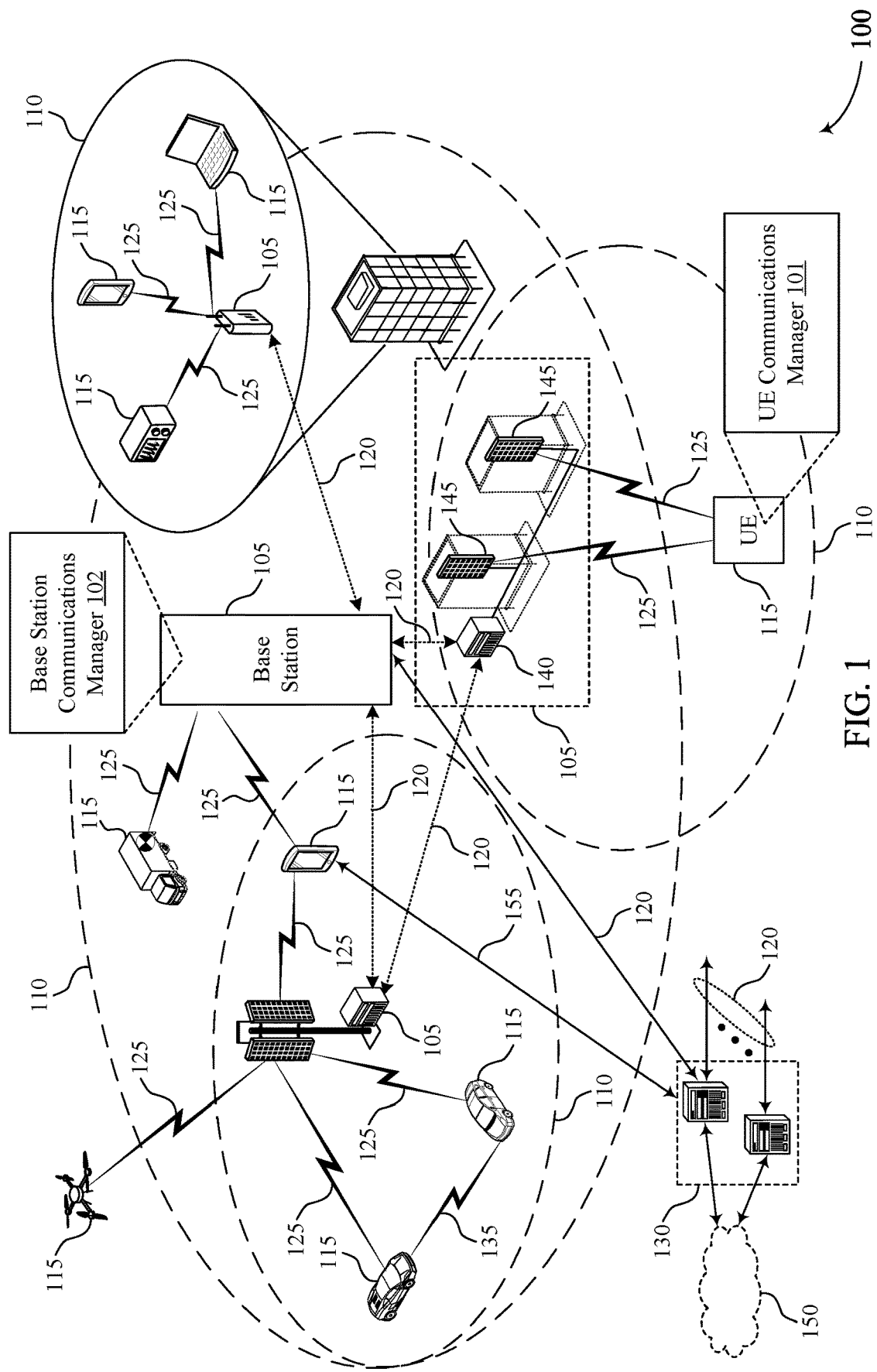
FIG. 1 illustrates an example of a wireless communications system that supports MCSs for high band wireless communications in accordance with one or more aspects of the present disclosure.

In some wireless communications systems, a UE may operate using a frequency band and SCS, where the SCS may be the distance between subcarriers in the frequency domain. A base station may indicate to a UE the frequency band and the SCS with which to operate. A base station may also indicate an MCS to the UE where the number of bits carried by each resource element may depend on the MCS. Accordingly, the base station and UE may communicate on a frequency band using an SCS and an MCS.

Wireless communications systems that support millimeter wave (mmW) communications may suffer performance degradation due to phase noise when operating using high frequencies and a relatively smaller SCS. In some cases, phase tracking reference signals may be unsupported to correct the phase noise for random access messages, and thus, small SCS at high frequencies may decrease reliability. In another example, higher order MCSs are more sensitive to the impact of phase noise. This sensitivity is amplified when operating using high frequencies and small SCS. Thus, a UE operating using high frequencies, small SCS, and a higher order MCS may suffer from reduced reliability, which may lead to lost transmissions.

In order to reduce the impact of phase noise and increase the reliability of transmissions, a UE and base station may communicate using an MCS based on the frequency band at which it is transmitting and the SCS utilized. For example, a UE may determine a frequency band and an SCS associated with the frequency band available for a random access procedure between the UE and the base station. Based on the frequency band and SCS, the UE may select an MCS from a set of MCSs for a random access message of the random access procedure. After selecting the MCS, the UE may transmit the random access message to the base station via a RACH of the frequency band using the associated SCS and selected MCS. In some cases, the base station may determine the frequency band and associated SCS available for the random access procedure. Here, the base station may select the MCS from the set of MCSs based on the frequency band and SCS and transmit an indication of the selected MCS for the random access message to the UE. In response to the indication, the UE may select the corresponding MCS and transmit the random access message according to the frequency band, SCS, and selected MCS. In some cases, the base station or UE may select the MCS based on the frequency band and SCS satisfying various threshold values for the frequency band and SCS.

In other cases, a UE may transmit the random access messages according to a reference signal configuration that is determined based on the selected MCS. A base station may configure the UE with a number of reference signal configurations each associated with an MCS, for a connected UE in a contention free RACH procedure. The selected MCS may include an order of the MCS and the UE may select a reference signal configuration based on comparing the order of the selected MCS to orders of the MCSs associated with the reference signal configurations. The UE may then transmit the random access message according to the selected MCS and reference signal configuration.

Some techniques described herein may not be limited to UEs in a connected state and in contention free RACH and may support additional or other operating scenarios such as a UE in an idle or inactive state, or contention-based RACH, among others. In such cases, for example, the base station may transmit an association between a set of random access preambles, a set of random access occasions, and a set of reference signal configurations to the UE. Here, the UE may determine a recommended reference signal configuration from the set of reference signal configuration and the corresponding random access preamble and random access occasion. The UE may transmit the random access message according to the selected MCS, the recommended reference signal configuration, and the corresponding random access preamble via the corresponding random access occasion. The base station may then determine the reference signal configuration of the random access message based on receiving the random access preamble via the random access occasion.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to MCSs for high band wireless communications.

FIG. 1 illustrates an example of a wireless communications system 100 that supports MCSs for high band wireless communications in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and SCS are inversely related. The number of bits carried by each resource element may depend on the MCS (e.g., the order of the MCS, the coding rate of the MCS, or both). Thus, the more resource elements that a UE 115 receives and the higher the order of the MCS, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include an SCS and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may also operate in a super high frequency (SHF) region using frequency bands from 3 GHz to 30 GHz, also known as the centimeter band, or in an EHF region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 and base station 105 may communicate according to a frequency band, SCS, and MCS. In some cases, a UE 115 may use a random access procedure to establish or re-establish a connection with a base station 105 or identify parameters and configurations for communicating with the base station 105. For example, a UE 115 in a connected mode (e.g., RRC connected mode) in a contention free RACH, may determine a frequency band and an SCS available for a random access procedure between the UE 115 and the base station 105. Based on the frequency band and SCS, the UE 115 may select an MCS from a set of MCSs for a random access message of the random access procedure. After selecting the MCS, the UE 115 may transmit the random access message to the base station 105 via a RACH of the frequency band using the associated SCS and selected MCS. In some cases, the base station 105 may determine the frequency band and associated SCS available for the random access procedure. Here, the base station 105 may select the MCS from the set of MCSs based on the frequency band and SCS and transmit an indication of the selected MCS for the random access message to the UE 115. In response to the indication, the UE 115 may select the corresponding MCS and transmit the random access message according to the frequency band, SCS, and selected MCS. In some cases, the base station 105 or UE 115 may select the MCS based on the frequency band and SCS satisfying various threshold values for the frequency band and SCS.

Additionally or alternatively, a UE 115 may transmit the random access messages according to a reference signal configuration that is determined based on the selected MCS. A base station 105 may configure the UE 115 with a number of reference signal configurations each associated with an MCS. The selected MCS may include an order of the MCS and the UE 115 may select a reference signal configuration based on comparing the order of the selected MCS to orders of the MCSs associated with the reference signal configurations. The UE 115 may then transmit the random access message according to the selected MCS and reference signal configuration.

Some techniques described herein may not be limited to UEs 115 in a connected state and in contention free RACH and may support additional or other operating scenarios such as a UE 115 in an idle or inactive state, or contention-based RACH, among others. In such cases, the base station 105 may transmit an association between a set of random access preambles, a set of random access occasions, and a set of reference signal configurations to the UE 115. Here, the UE 115 may determine a preferred reference signal configuration from the set of reference signal configuration and the corresponding random access preamble and random access occasion. The UE 115 may transmit the random access message according to the selected MCS, the preferred reference signal configuration, and the corresponding random access preamble via the corresponding random access occasion. The base station 105 may then determine the reference signal configuration of the random access message based on receiving the random access preamble via the random access occasion.

A UE 115 may include a UE communications manager 101, which may be used to determine a frequency band and an SCS available for a random access procedure between the UE 115 and a base station 105. The UE communications manager 101 may select an MCS for a random access message of the random access procedure based on the frequency band and SCS available for the random access procedure. The UE communications manager 101 may transmit the random access message to the base station 105 via a RACH of the frequency band according to the SCS and the selected MCS.

A base station 105 may include a base station communications manager 102, which may be used to determine a frequency band and SCS available for a random access procedure between the base station 105 and a UE 115. The base station communications manager 102 may select an MCS for a random access message of the random access procedure based on the frequency band and SCS available for the random access procedure. The base station communications manager 102 may transmit an indication of the selected MCS for the random access message to the UE 115.

Figure 2:
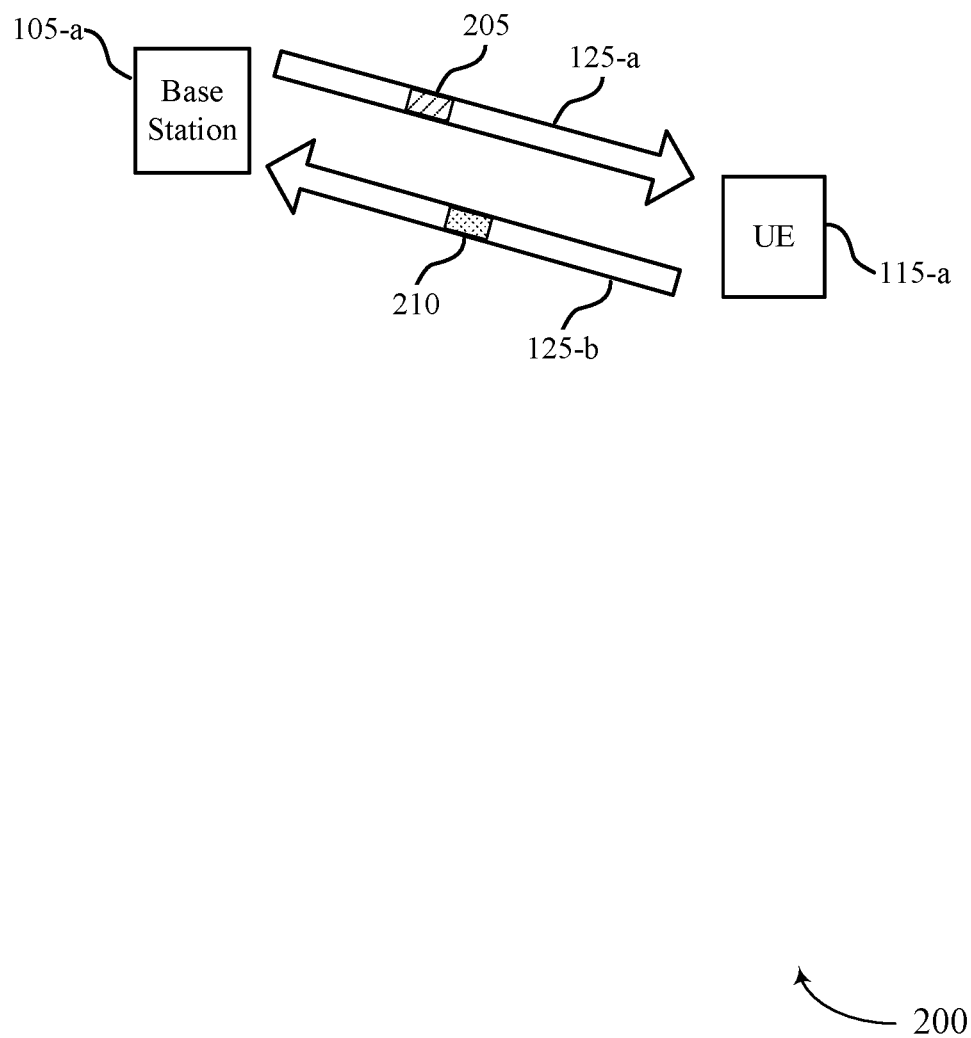
FIG. 2 illustrates an example of a wireless communications system that supports MCSs for high band wireless communications in accordance with one or more aspects of the present disclosure.

FIG. 2 illustrates an example of a wireless communications system 200 that supports MCSs for high band wireless communications in accordance with one or more aspects of the present disclosure. In some examples, wireless communications system 200 may implement aspects of wireless communications system 100. The wireless communications system 200 may include a UE 115-*a* and a base station 105-*a*, which may be respective examples of a UE 115 and a base station 105 as described with reference to FIG. 1.

A UE 115-*a* may support high band wireless communications. For example, the UE 115-*a* may support communication with a base station 105-*a* in high frequency bands (e.g., SHF, EHF). The UE 115-*a* may also support communication with base station 105-*a* using various SCSs (e.g., 30 kHz, 60 kHz, 120 kHz, 960 kHz) and MCSs. As more of frequency spectrum is utilized, higher order MCSs may be employed for communication. For example, radio access technologies may utilize QPSK, 16-QAM, 64-QAM, 256-QAM, and 1024-QAM modulation orders. The UE 115-*a* may communicate with the base station 105-*a* via communication links 125. For example, the UE 115-*a* and the base station 105-*a* may transmit and receive random access messages of a random access procedure via communication links 125. Communication link 125-*a* and communication link 125-*b* may be examples of a communication link 125 as described with reference to FIG. 1.

A UE 115-*a* may use a random access procedure to establish or re-establish a connection with a base station 105-*a* or identify suitable parameters and configurations for communicating with the base station 105-*a*. Wireless communications system 200 may support four-step random access procedures and two-step random access procedures. A four-step random access procedure may include four message exchanges between a UE 115-*a* and a base station 105-*a*, and a two-step random access procedure may include two message exchanges between a UE 115-*a* and a base station 105-*a*. In both procedures, it may be appropriate for a UE 115-*a* to transmit data or control information to a base station 105-*a*. In a four-step random access procedure, the UE 115-*a* may transmit the data or control information in a third random access message (e.g., MSG3) to the base station 105-*a*. In a two-step random access procedure, the UE 115-*a* may transmit the data or control information in a first random access message (e.g., MSG1 or MSGA) to the base station 105-*a*.

A UE 115-*a* may determine to perform a random access procedure with a base station 105-*a* (e.g., a two-step random access procedure, a four-step random access procedure). In order to perform the random access procedure, the base station 105-*a* may transmit RACH configuration information 205 to the UE 115-*a* in system information or in RRC signaling via communication link 125-*a*. The base station 105-*a* may determine a frequency band and an SCS available for the random access procedure. The base station 105-*a* may select an MCS from a set of MCSs for a random access message 210 of the random access procedure. The base station 105-*a* may select the MCS based on the available frequency band and SCS. After selecting the MCS, the base station 105-*a* may transmit an indication of the available frequency band, SCS, and selected MCS for the random access message 210 in RACH configuration information 205.

In some cases, the base station 105-*a* may determine a threshold MCS based on the frequency band and SCS and select the MCS based on the MCS satisfying the threshold MCS. For example, the base station 105-*a* may determine that a 60 GHz frequency band with a 60 kHz SCS is available for a random access procedure. Here, the base station 105-*a* may determine that MCSs of an order higher than a QPSK MCS at the 60 GHz frequency band with 60 kHz SCS may be sensitive to phase noise. The base station 105-*a* may determine that a QPSK MCS is a threshold MCS and selects the QPSK MCS for random access message 210 of the random access procedure. In another example, the base station 105-*a* may determine that a 60 GHz frequency band with a 120 kHz SCS is available for a random access procedure. Here, the base station 105-*a* may determine that MCSs of an order higher than a 16 QAM MCS at the 60 GHz frequency band with 120 kHz SCS may be sensitive to phase noise. The base station 105-*a* may determine that a 16 QAM MCS is a threshold MCS and select the QPSK MCS or 16 QAM MCS for random access message 210 of the random access procedure. In yet another example, the base station 105-*a* may determine that a 90 GHz frequency band with a 120 kHz SCS is available for a random access procedure. Here, the base station 105-*a* may determine that MCSs of an order higher than an eighth order MCS at the 90 GHz frequency band with 120 kHz SCS may be sensitive to phase noise. The base station 105-*a* may determine that an eighth MCS is a threshold MCS and select an MCS that satisfies the threshold MCS for random access message 210 of the random access procedure.

A UE 115-*a* may receive the indication in RACH configuration information 205 from base station 105-*a* and determine the frequency band and SCS available for the random access procedure. The UE 115-*a*, which may be in a connected mode and for contention free RACH scenarios, may select an MCS from a set of MCSs for the random access message 210 of the random access procedure based on the available frequency band and SCS. In some cases, the UE 115-*a* may select the MCS based on receiving the indication of the MCS selected by the base station 105-*a*. In some examples, the UE 115-*a* may select the MCS indicated by the base station 105-*a*.

In some cases, the UE 115-*a* may determine a threshold MCS based on the frequency band and SCS and select the MCS based on the MCS satisfying the threshold MCS. For example, the UE 115-*a* may determine that a 60 GHz frequency band with a 60 kHz SCS is available for a random access procedure. Here, the UE 115-*a* may determine that MCSs of an order higher than a QPSK MCS at the 60 GHz frequency band with 60 kHz SCS may be sensitive to phase noise. The UE 115-*a* may determine that a QPSK MCS is a threshold MCS and selects the QPSK MCS for random access message 210 of the random access procedure. In another example, the UE 115-*a* may determine that a 60 GHz frequency band with a 120 kHz SCS is available for a random access procedure. Here, the UE 115-*a* may determine that MCSs of an order higher than a 16 QAM MCS at the 60 GHz frequency band with 120 kHz SCS may be sensitive to phase noise. The UE 115-*a* may determine that a 16 QAM MCS is a threshold MCS and select the QPSK MCS or 16 QAM MCS for random access message 210 of the random access procedure. In yet another example, the UE 115-*a* may determine that a 90 GHz frequency band with a 120 kHz SCS is available for a random access procedure. Here, the UE 115-*a* may determine that MCSs of an order higher than an eighth order MCS at the 90 GHz frequency band with 120 kHz SCS may be sensitive to phase noise. The UE 115-*a* may determine that an eighth MCS is a threshold MCS and select an MCS that satisfies the threshold MCS for random access message 210 of the random access procedure.

The base station 105-*a* may transmit an uplink grant in the indication included in RACH configuration information 205. The uplink grant may include a set of bits for the UE 115-*a* to convey an indication of the selected MCS, where the set of bits includes at least one reserved bit independent of the bits used to convey the indication. For example, four bits may be reserved for the UE 115-*a* to convey the indication of the selected MCS to the base station 105-*a*. If the base station 105-*a* selects a QPSK MCS or an eighth order MCS for the UE 115-*a* to use for random access message 210, only three bits may be necessary to convey the indication of the selected MCS. The base station 105-*a* may transmit the uplink grant to the UE 115-*a* where the uplink grant includes the four bits, three bits to convey the indication and one reserved bit for other use. In some cases, the reserved bit may facilitate DMRS multiplexing for random access message 210. In other cases, the reserved bit corresponds to a transport block size scaling value for random access message 210.

In some cases, the base station 105 may indicate the selected MCS via an MCS index, which corresponds to an MCS table. The MCS table may include information such as MCS indices, modulation orders, target code rates, and spectral efficiencies (which may be determined based on the modulation order and target code rate). The UE 115-*a* may select an MCS table from which to select the MCS for random access message 210 from a set of MCS tables. In some cases, an MCS table includes a set of MCSs that each include an order of the MCS. In some instances, an MCS table may include a set of MCSs having lower modulation orders relative to the modulation orders of other MCS tables. In some examples, the UE 115-*a* may select the MCS table based on the frequency band and SCS indicated by the base station 105-*a* in RACH configuration information 205. For example, if the UE 115-*a* determines that a 60 GHz frequency band with a 60 kHz SCS is available for a random access procedure (e.g., as indicated by the base station 105-*a*), then the UE 115-*a* may select the MCS table from the set of MCS tables having lower modulation orders relative to the other MCS tables of the set. Here the UE 115-*a* may then select the MCS for random access message 210 from the MCS table having lower order modulation. In some examples, the UE 115-*a* may select an MCS table having higher modulation orders if a 60 GHz frequency band with a 120 kHz SCS is available for the random access procedure. In some cases, the UE 115-*a* may select the MCS table having lower modulation orders if a 90 GHz frequency band with a 120 kHz SCS is available for the random access procedure. In some instances, the UE 115-*a* may select an MCS table having higher modulations orders is a 90 GHz frequency band with a 960 kHz SCS is available for the random access procedure.

A UE 115-*a* may transmit random access message 210 according to a reference signal configuration that is determined based on the selected MCS. The base station 105-*a* may configure the UE 115 with a number of reference signal configurations each associated with an MCS. Each reference signal configuration may be associated with a time density of phase tracking reference signals with which to transmit. For example, if the UE 115-*a* transmitted random access message 210 according to a reference signal configuration with a time density of four, then the UE 115-*a* would transmit random access message 210 with a phase tracking reference signal every four symbols. The selected MCS may include an order of the MCS and the UE 115-*a* may select a reference signal configuration based on comparing the order of the selected MCS to orders of the MCSs associated with the reference signal configurations. In some cases, the UE 115-*a* may determine a preference for the reference signal configuration. In some cases, the UE 115-*a* may select the MCS based on the preference for the reference signal modulation. The UE 115-*a* may transmit random access message 210 according to the selected MCS and preferred reference signal configuration. Here, the UE 115-*a* transmits one or more phase tracking reference signals with random access message 210 according to the time density associated with the selected reference signal configuration. In some cases, the UE 115-*a* transmits an indication of the preference for the reference signal configuration to the base station 105-*a* prior to transmitting random access message 210.

Some techniques described herein may not be limited to UEs 115 in a connected state and in contention free RACH and may support additional or other operating scenarios such as a UE 115 in an idle or inactive state, or contention-based RACH, among others. In such cases, the base station 105-*a* may transmit an association between a set of random access preambles, a set of random access occasions, and a set of reference signal configurations to the UE 115-*a*. Here, the UE 115-*a* may determine a preference for a reference signal configuration from the set of reference signal configurations. The preferred reference signal configuration may correspond to a random access preamble and random access occasion that indicate the preferred reference signal configuration to the base station 105-*a*. The UE 115-*a* may transmit random access message 210 according to the selected MCS, the preferred reference signal configuration, and the corresponding random access preamble via the corresponding random access occasion. The base station 105-*a* may then determine the reference signal configuration of the random access message 210 based on receiving the random access preamble via the random access occasion.

Figure 3:
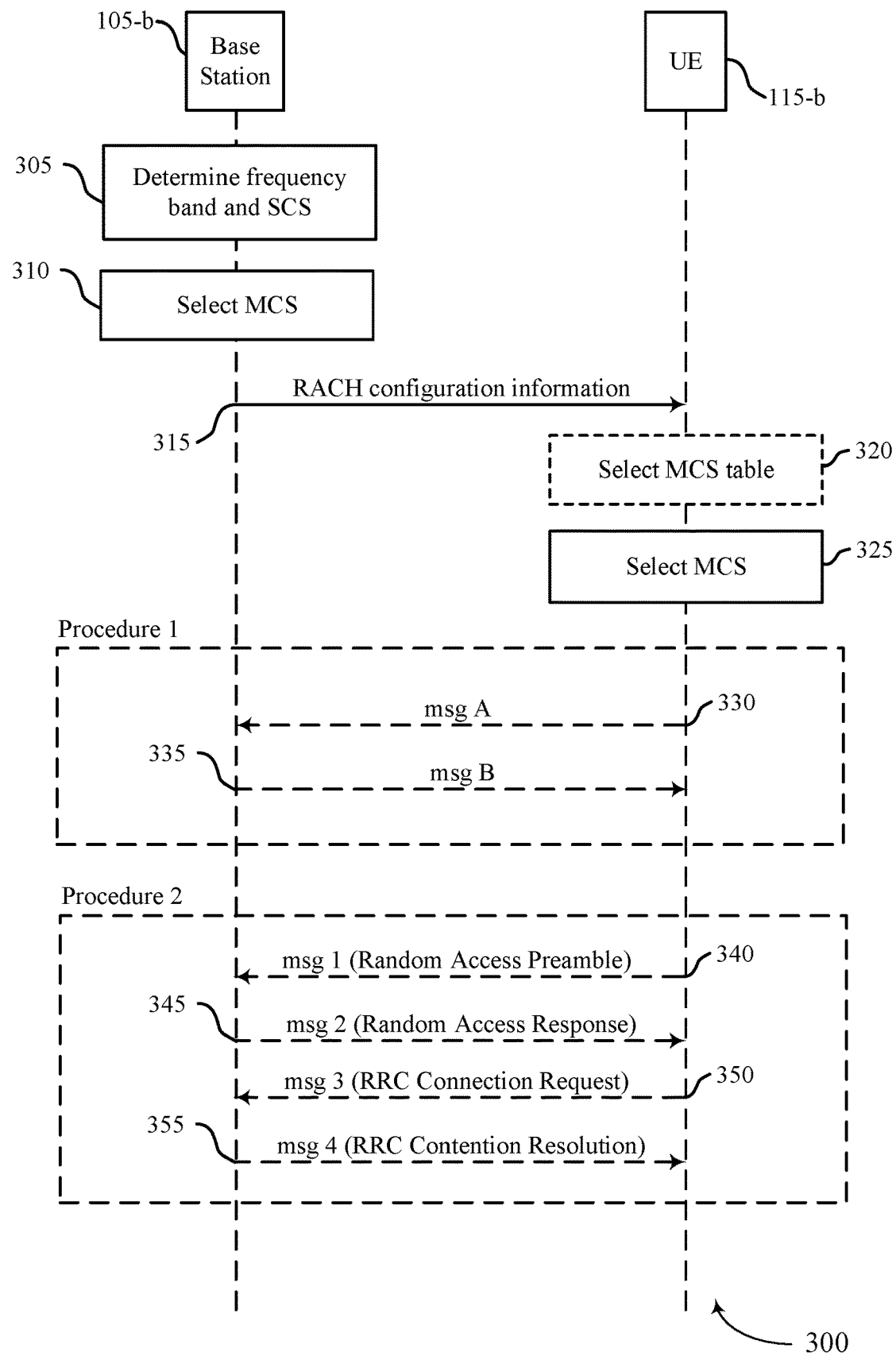
FIG. 3 illustrates an example of a process flow that supports MCSs for high band wireless communications in accordance with one or more aspects of the present disclosure.

FIG. 3 illustrates an example of a process flow 300 that supports MCSs for high band wireless communications in accordance with one or more aspects of the present disclosure. In some examples, process flow 300 may implement aspects of wireless communications system as described with reference to FIGS. 1 and 2. Aspects of process flow 300 may be implemented by UE 115-*b*, which may be an example of the UEs 115 as described with respect to FIGS. 1 and 2. Aspects of process flow 300 may be further implemented by base station 105-*b*, which may be an example of the base stations 105 as described with respect to FIGS. 1 and 2.

At 305, the base station 105-*b* may determine a frequency band and an SCS available for a random access procedure between the base station 105-*b* and the UE 115-*b*. The random access procedure may be a two-step random access procedure or a four-step random access procedure.

At 310, the base station 105-*b* may select an MCS from a set of MCSs for a random access message of the random access procedure based on the available frequency band and SCS. In some cases, the base station 105-*b* may determine a threshold MCS based on the frequency band and SCS and select the MCS based on the MCS satisfying the threshold MCS.

At 315, the base station 105-*b* may transmit RACH configuration information to the UE 115-*b* that includes an indication of the available frequency band, SCS, and selected MCS for the random access message. In some cases, the RACH configuration information may include an MCS index corresponding to an MCS table. In some instances, the base station 105-*b* may transmit an uplink grant in the indication included in the RACH configuration information. The uplink grant may include a set of bits for the UE 115-*b* to convey an indication of the selected MCS, where the set of bits includes at least one reserved bit independent of the bits used to convey the indication.

At 320, the UE 115-*b* may optionally select an MCS table to use when selecting the MCS for the random access message of the random access procedure. In some cases, the UE 115-*b* selects the MCS table based on the MCS index included in the RACH configuration information. In some cases, the UE 115-*b* may select the MCS table from a set of MCS tables having lower modulation orders relative to the other MCS tables of the set.

At 325, the UE 115-*b* may select to MCS for the random access message based on the available frequency band and SCS. In some cases, the UE 115-*b* may determine a threshold MCS based on the frequency band and SCS and select the MCS based on the MCS satisfying the threshold MCS. In some examples, the UE 115-*b* may select the MCS based from the selected MCS table. Based on the random access procedure (e.g., a two-step random access procedure or a four-step random access procedure), process flow 300 may optionally follow a first procedure, herein referred to as Procedure 1, or a second procedure, herein referred to as Procedure 2. For example, the process flow 300 may follow Procedure 1 if the random access procedure is a two-step random access procedure. Additionally, the process flow 300 may follow Procedure 2 if the random access procedure is a four-step random access procedure.

For Procedure 1, at 330, the UE 115-*b* may transmit the random access message (e.g., MSGA) via a RACH of the frequency band according to the SCS and selected MCS. In some examples, the UE 115-*b* may transmit the random access message according to the uplink grant that includes a set of bits for conveying an indication of the MCS, where the set of bits includes at least one reserved bit independent of the bits used to convey the indication At 335, the base station 105-*b* may transmit a contention resolution message (e.g., MSGB) indicating that the two-step random access procedure was successful.

For Procedure 2, at 340, the UE 115-*b* may transmit a random access preamble to the base station 105-*b* in a first random access message. At 345, the base station 105-*b* may transmit a second random access message (e.g., random access response) in response to the random access preamble. At 350, the UE 115-*b* may transmit a third random access message (e.g., MSG3) via a RACH of the frequency band according to the SCS and selected MCS to the base station 105-*b*. At 355, the base station 105-*b* may transmit a RRC contention resolution message to the UE 115-*b* indicating that the four-step random access procedure was successful.

Figure 4:
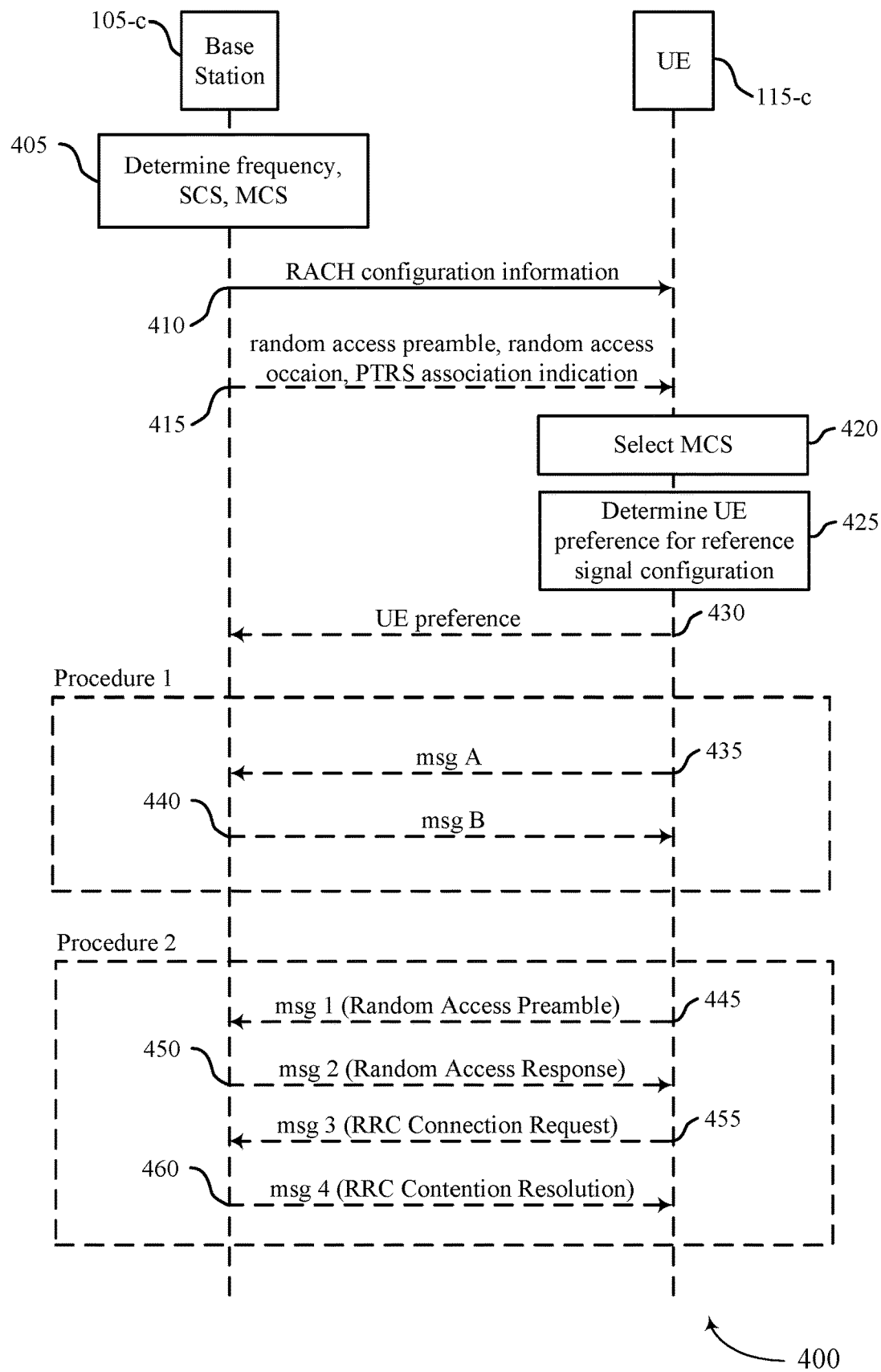
FIG. 4 illustrates an example of a process flow that supports MCSs for high band wireless communications in accordance with one or more aspects of the present disclosure.

FIG. 4 illustrates an example of a process flow 400 that supports MCSs for high band wireless communications in accordance with one or more aspects of the present disclosure. In some examples, process flow 400 may implement aspects of wireless communications system as described with reference to FIGS. 1 and 2. Aspects of process flow 400 may be implemented by UE 115-*c*, which may be an example of the UEs 115 as described with respect to FIGS. 1 through 3. Aspects of process flow 400 may be further implemented by base station 105-*c*, which may be an example of the base stations 105 as described with respect to FIGS. 1 through 3.

At 405, the base station 105-*c* may determine a frequency band and an SCS available for a random access procedure between the base station 105-*c* and the UE 115-*c*. The random access procedure may be a two-step random access procedure or a four-step random access procedure. The base station 105-*c* may also select an MCS for a random access message of the random access procedure based on the available frequency band and SCS.

At 410, the base station 105-*c* may transmit RACH configuration information to the UE 115-*c* that includes an indication of the available frequency band, SCS, and selected MCS for the random access message. In some instances, the base station 105-*c* may transmit an uplink grant in the indication included in the RACH configuration information. The uplink grant may include a set of bits for the UE 115-*c* to convey an indication of the selected MCS, where the set of bits includes at least one reserved bit independent of the bits used to convey the indication.

At 415, the base station 105-*c* may optionally transmit an association between a set of random access preambles, a set of random access occasions, and a set of reference signal configurations to the UE 115-*c*. In some cases, the base station transmits the association in the RACH configuration information at 410. The operations of 415 may not be limited to UEs in a connected state and in contention free RACH and may support additional or other operating scenarios such as a UE in an idle or inactive state, or contention-based RACH, among others.

At 420, the UE 115-*c* may select an MCS for the random access message based on the available frequency band and SCS.

At 425, the UE 115-*c* may determine a preference for a reference signal configuration for phase tracking reference signals. In some instances, the UE 115-*c* may determine the preference based on the selected MCS. In some cases, the selected MCS may include an order of the MCS and the UE 115-*c* may determine a preferred reference signal configuration based on comparing the order of the selected MCS to the order of an MCS associated with the preferred reference signal configuration. In some examples, the preferred reference signal configuration may be associated with a time density of phase tracking reference signals with which to transmit. In some cases, the UE 115-*c* may select the MCS based on the preference for the reference signal modulation at 420.

At 430, the UE 115-*c* may optionally transmit an indication of the UE preference to the base station 105-*c*. Based on the random access procedure (e.g., a two-step random access procedure or a four-step random access procedure), process flow 400 may optionally follow a first procedure, herein referred to as Procedure 1, or a second procedure, herein referred to as Procedure 2. For example, the process flow 400 may follow Procedure 1 if the random access procedure is a two-step random access procedure. Additionally, the process flow 400 may follow Procedure 2 if the random access procedure is a four-step random access procedure.

For Procedure 1, at 435, the UE 115-*c* may transmit the random access message (e.g., MSGA) via a RACH of the frequency band according to the SCS, selected MCS, and reference signal configuration. At 440, the base station 105-*c* may transmit a contention resolution message (e.g., MSGB) indicating that the two-step random access procedure was successful.

For Procedure 2, at 445, the UE 115-*c* may transmit a random access preamble to the base station 105-*c* in a first random access message. At 450, the base station 105-*c* may transmit a second random access message (e.g., random access response) in response to the random access preamble. At 455, the UE 115-*c* may transmit a third random access message (e.g., MSG3, RRC connection request) via a RACH of the frequency band according to the SCS, selected MCS, and reference signal configuration to the base station 105-*c*. At 460, the base station 105-*c* may transmit a RRC contention resolution message to the UE 115-*c* indicating that the four-step random access procedure was successful.

Figure 5:
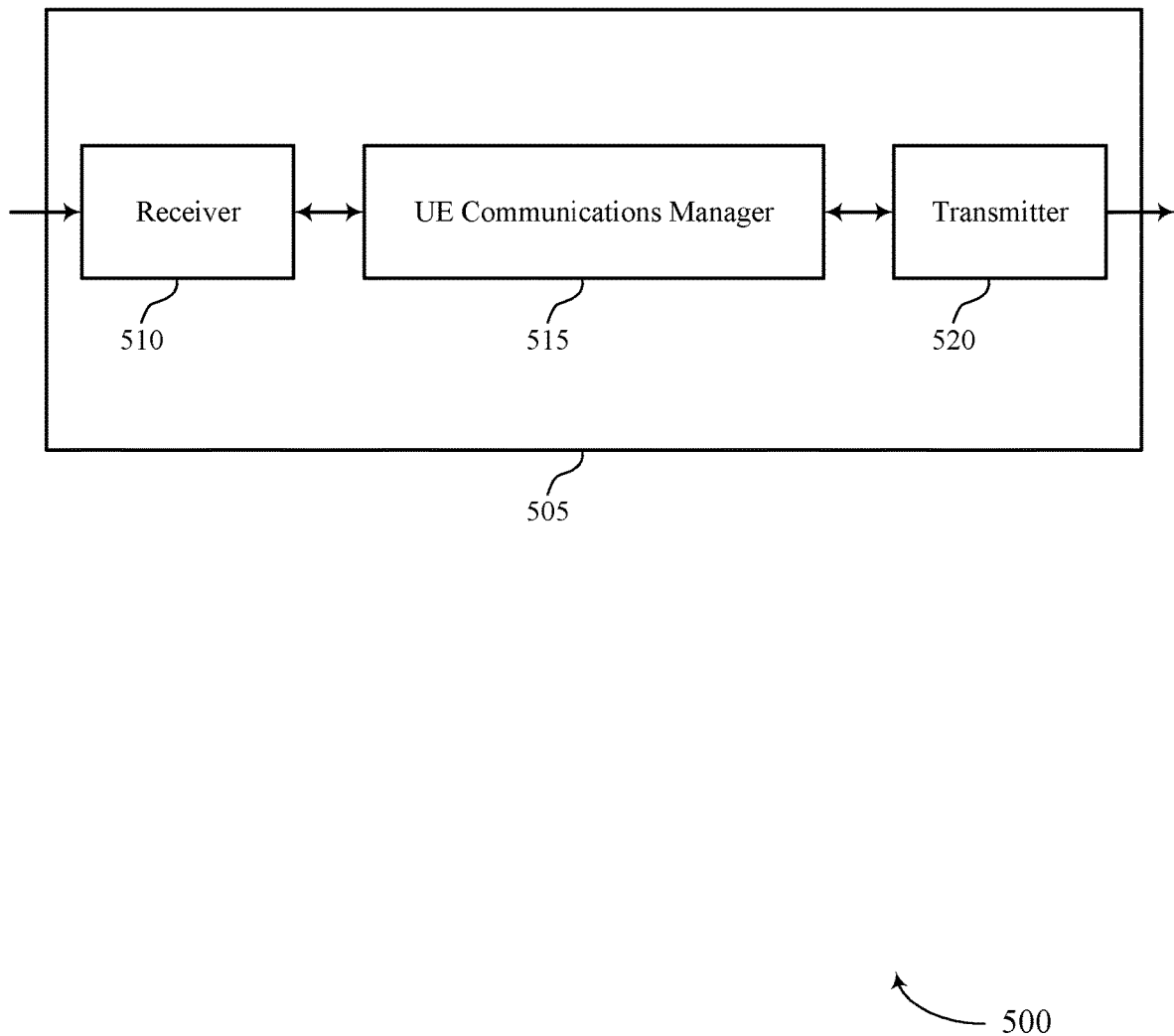
FIGS. 5 and 6 show block diagrams of devices that support MCSs for high band wireless communications in accordance with one or more aspects of the present disclosure.

FIG. 5 shows a block diagram 500 of a device 505 that supports MCSs for high band wireless communications in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to MCSs for high band wireless communications, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may determine a frequency band available for a random access procedure between the UE and a base station, determine an SCS associated with the frequency band, select, from a set of MCSs, an MCS for a random access message of the random access procedure based on the frequency band and the SCS associated with the frequency band, and transmit the random access message to the base station via a RACH of the frequency band in accordance with the SCS and selected MCS. The UE communications manager 515 may be an example of aspects of the UE communications manager 810 described herein.

Additionally or alternatively, the UE communications manager 515 may receive, from a base station, an indication of an MCS for a random access message of a random access procedure based on a frequency band for the random access procedure and an SCS associated with the frequency band and transmit the random access message to the base station via a RACH of the frequency band in accordance with the SCS and the MCS. The UE communications manager 515 may be an example of aspects of the UE communications manager 810 described herein.

The UE communications manager 515 may be an example of means for performing various aspects of managing smart repeaters as described herein. The UE communications manager 515, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the UE communications manager 515, or its sub-components, may be implemented in code (e.g., as communications management software or firmware) executed by a processor, or any combination thereof. If implemented in code executed by a processor, the functions of the UE communications manager 515, or its sub-components may be executed by a general-purpose processor, a DSP, an ASIC, an FPGA or other programmable logic device.

In some examples, the UE communications manager 515 may be configured to perform various operations (e.g., receiving, determining, selecting, transmitting) using or otherwise in cooperation with the receiver 510, the transmitter 520, or both.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the UE communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The UE communications manager 515 as described herein may be implemented to enable the device 405 to transmit messages of a RACH procedure using an MCS selected based on the frequency band and the SCS, which may increase reliability when operating at higher frequencies and smaller SCSs. Some implementations of the UE communications manager 515 may enable the device 405 to utilize a phase tracking reference signal configuration for one or more phase tracking reference signals included with a random access message transmission. Such techniques may reduce or correct for phase noise as part of the RACH procedure, enabling the device 405 to support more efficient communications and successful RACH procedures.

Figure 6:
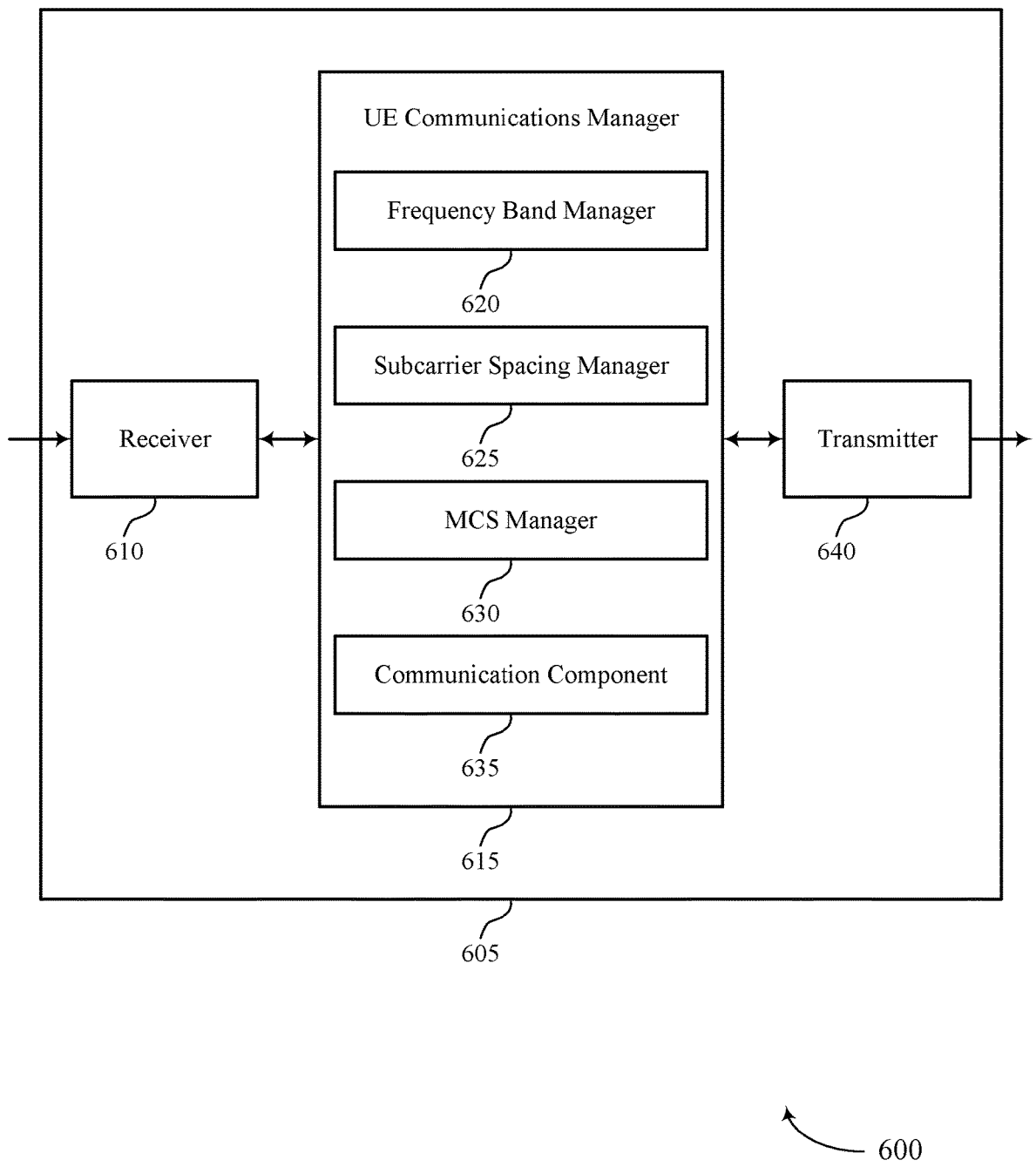

FIG. 6 shows a block diagram 600 of a device 605 that supports MCSs for high band wireless communications in accordance with aspects of the present disclosure. The device 605 may be an example of aspects of a device 505, or a UE 115 as described herein. The device 605 may include a receiver 610, a UE communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to MCSs for high band wireless communications, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a frequency band manager 620, an SCS manager 625, an MCS manager 630, and a communication component 635. The UE communications manager 615 may be an example of aspects of the UE communications manager 810 described herein.

The frequency band manager 620 may determine a frequency band available for a random access procedure between the UE and a base station.

The SCS manager 625 may determine an SCS associated with the frequency band.

The MCS manager 630 may select, from a set of MCSs, an MCS for a random access message of the random access procedure based on the frequency band and the SCS associated with the frequency band.

The communication component 635 may transmit the random access message to the base station via a RACH of the frequency band in accordance with the SCS and selected MCS.

Additionally or alternatively, the MCS manager 630 may receive, from a base station, an indication of an MCS for a random access message of a random access procedure based on a frequency band for the random access procedure and an SCS associated with the frequency band. The communication component 635 may transmit the random access message to the base station via a RACH of the frequency band in accordance with the SCS and the MCS.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
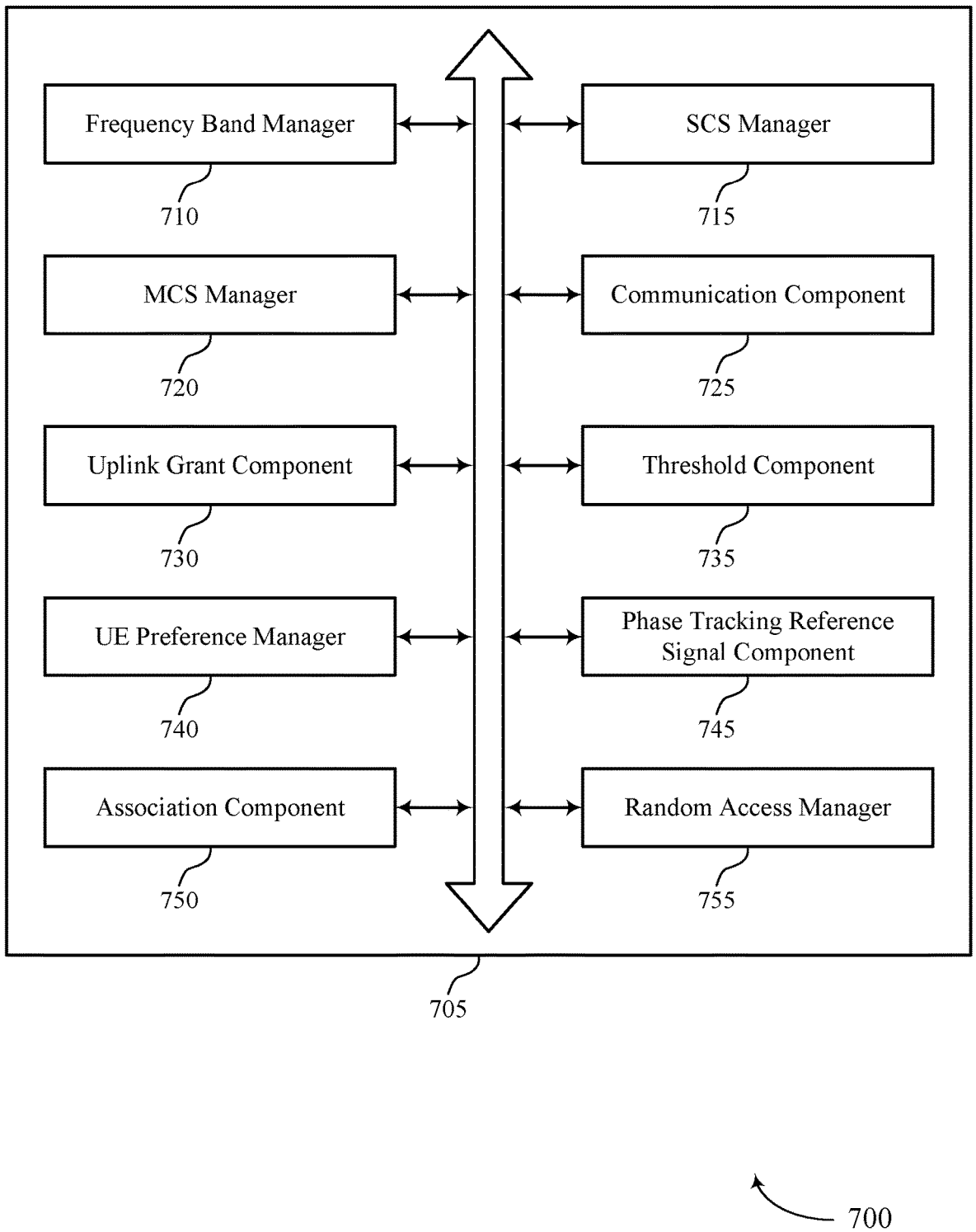
FIG. 7 shows a block diagram of a communications manager that supports MCSs for high band wireless communications in accordance with one or more aspects of the present disclosure.

FIG. 7 shows a block diagram 700 of a UE communications manager 705 that supports MCSs for high band wireless communications in accordance with aspects of the present disclosure. The UE communications manager 705 may be an example of aspects of a UE communications manager 515, a UE communications manager 615, or a UE communications manager 810 described herein. The UE communications manager 705 may include a frequency band manager 710, an SCS manager 715, an MCS manager 720, a communication component 725, an uplink grant component 730, a threshold component 735, a UE preference manager 740, a phase tracking reference signal component 745, an association component 750, and a random access manager 755. Each of these modules may communicate, directly or indirectly, with one another (e.g., via one or more buses).

The frequency band manager 710 may determine a frequency band available for a random access procedure between the UE and a base station.

The SCS manager 715 may determine an SCS associated with the frequency band.

The MCS manager 720 may select, from a set of MCSs, an MCS for a random access message of the random access procedure based on the frequency band and the SCS associated with the frequency band. In some examples, the MCS manager 720 may receive, from the base station, an indication of the MCS to select from the set of MCSs, where the MCS is selected based on the indication. In some examples, the MCS manager 720 may select the MCS based on the reference signal configuration. In some examples, the MCS manager 720 may select an MCS table from a set of MCS tables based on the frequency band and the SCS associated with the frequency band, where the MCS for the random access message is selected from the MCS table. In some cases, the MCS table includes a set of MCSs having lower modulation orders relative to all other MCS tables of the set of MCS tables.

The communication component 725 may transmit the random access message to the base station via a RACH of the frequency band in accordance with the SCS and selected MCS. In some examples, the communication component 725 may transmit an indication of the UE preference to the base station.

The uplink grant component 730 may receive an uplink grant that includes a set of bits for conveying the indication of the MCS, where the set of bits includes at least one reserved bit independent of conveying the indication of the MCS. In some cases, the at least one reserved bit is associated with DMRS multiplexing for the random access message. In some cases, the at least one reserved bit corresponds to a transport block size scaling value for the random access message.

The threshold component 735 may determine a threshold MCS based on the frequency band and the SCS associated with the frequency band, where the selected MCS satisfies the threshold MCS. In some cases, the threshold MCS includes one of a QPSK modulation or a 16 QAM.

The UE preference manager 740 may determine a UE preference for a reference signal configuration for phase tracking based on the selected MCS. In some examples, the UE preference manager 740 may determine a random access preamble and a random access occasion based on the UE preference for the reference signal configuration.

The phase tracking reference signal component 745 may transmit one or more phase tracking reference signals in accordance with the reference signal configuration, where the one or more phase tracking reference signals are transmitted with the random access message.

The association component 750 may determine an association between a set of random access preambles, a set of random access occasions, and a set of reference signal configurations.

The random access manager 755 may select the random access preamble and the random access occasion based on a second reference signal configuration of the set of reference signal configurations corresponding to the reference signal configuration.

Additionally or alternatively, The MCS manager 720 may be configured as or otherwise support a means for receiving, from a base station, an indication of an MCS for a random access message of a random access procedure based on a frequency band for the random access procedure and an SCS associated with the frequency band. The communication component 725 may be configured as or otherwise support a means for transmitting the random access message to the base station via a RACH of the frequency band in accordance with the SCS and the MCS.

In some examples, the MCS manager 720 may be configured as or otherwise support a means for selecting an MCS table from a set of MCS tables based on the frequency band and the SCS associated with the frequency band, where the MCS for the random access message is selected from the MCS table.

In some examples, the MCS table includes a set of MCSs having lower modulation orders relative to all other MCS tables of the set of MCS tables.

In some examples, the uplink grant component 730 may be configured as or otherwise support a means for receiving an uplink grant that includes a set of bits for conveying the indication of the MCS, where the set of bits includes at least one reserved bit independent of conveying the indication of the MCS.

In some examples, the at least one reserved bit is associated with DMRS multiplexing for the random access message.

In some examples, the at least one reserved bit corresponds to a transport block size scaling value for the random access message.

In some examples, the MCS satisfies a threshold MCS that is based on the frequency band and the SCS associated with the frequency band.

In some examples, the threshold MCS includes one of a QPSK modulation or a 16 QAM.

In some examples, the UE preference manager 740 may be configured as or otherwise support a means for transmitting, to the base station, an indication of a UE preference for a reference signal configuration for phase tracking based on the MCS.

In some examples, the phase tracking reference signal component 745 may be configured as or otherwise support a means for transmitting one or more phase tracking reference signals in accordance with the reference signal configuration, where the one or more phase tracking reference signals are transmitted with the random access message.

In some examples, the MCS manager 720 may be configured as or otherwise support a means for selecting the MCS based on the reference signal configuration.

In some examples, the random access manager 755 may be configured as or otherwise support a means for transmitting a random access preamble during a random access occasion based on the UE preference for the reference signal configuration.

In some examples, the association component 750 may be configured as or otherwise support a means for receiving an association between a set of random access preambles, a set of random access occasions, and a set of reference signal configurations. In some examples, the random access manager 755 may be configured as or otherwise support a means for selecting the random access preamble and the random access occasion based on a second reference signal configuration of the set of reference signal configurations corresponding to the reference signal configuration and the association.

Figure 8:
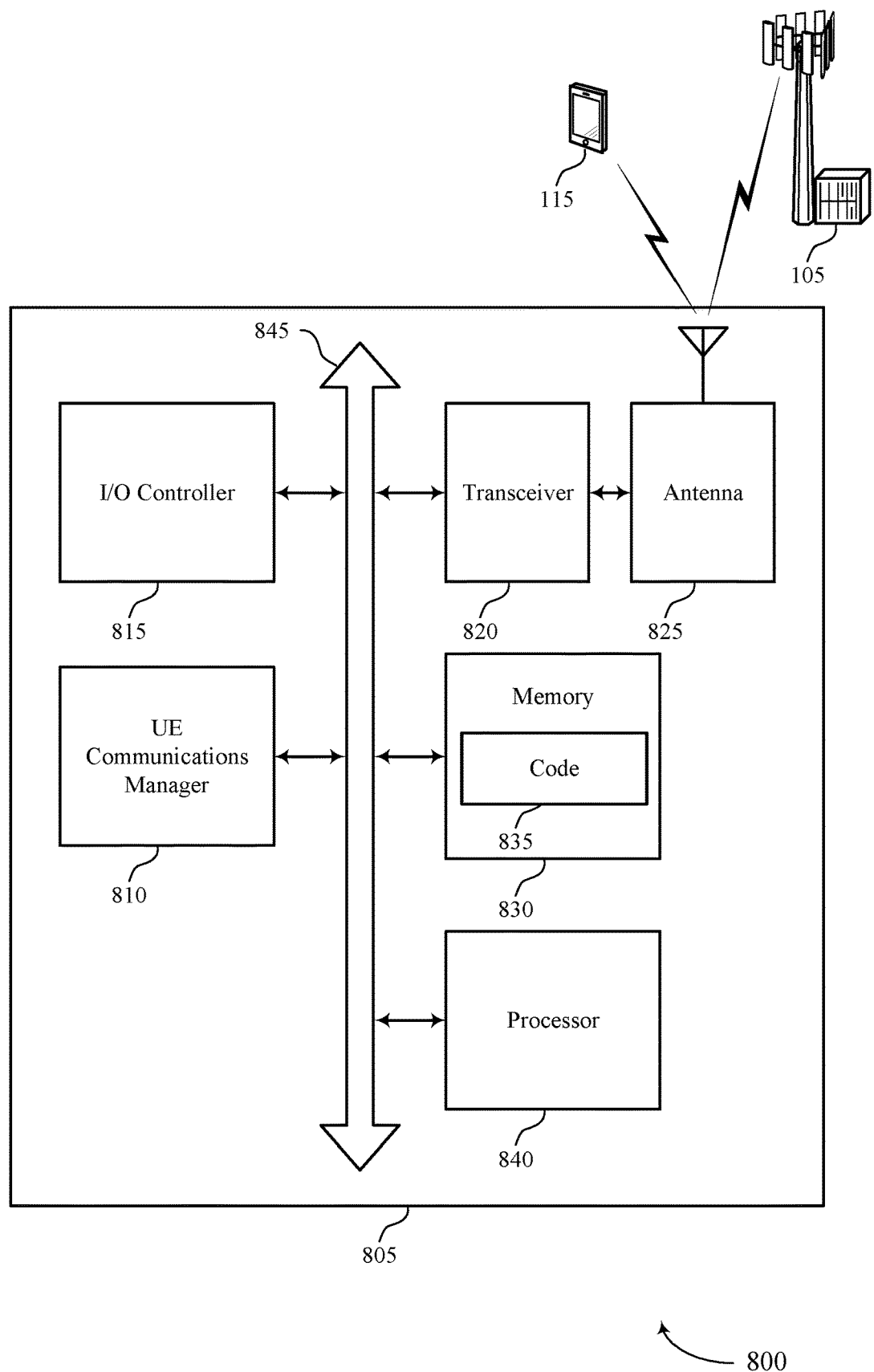
FIG. 8 shows a diagram of a system including a device that supports MCSs for high band wireless communications in accordance with one or more aspects of the present disclosure.

FIG. 8 shows a diagram of a system 800 including a device 805 that supports MCSs for high band wireless communications in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may determine a frequency band available for a random access procedure between the UE and a base station, determine an SCS associated with the frequency band, select, from a set of MCSs, an MCS for a random access message of the random access procedure based on the frequency band and the SCS associated with the frequency band, and transmit the random access message to the base station via a RACH of the frequency band in accordance with the SCS and selected MCS.

Additionally or alternatively, the UE communications manager 810 may receive, from a base station, an indication of an MCS for a random access message of a random access procedure based on a frequency band for the random access procedure and an SCS associated with the frequency band and transmit the random access message to the base station via a RACH of the frequency band in accordance with the SCS and the MCS.

By including or configuring the UE communications manager 810 in accordance with examples as described herein, the device 805 may support techniques for increased reliability, data rates, spectral efficiency, resource usage, coordination between devices, battery life, and processing capability and reduced latency and power consumption, among other benefits.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting MCSs for high band wireless communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
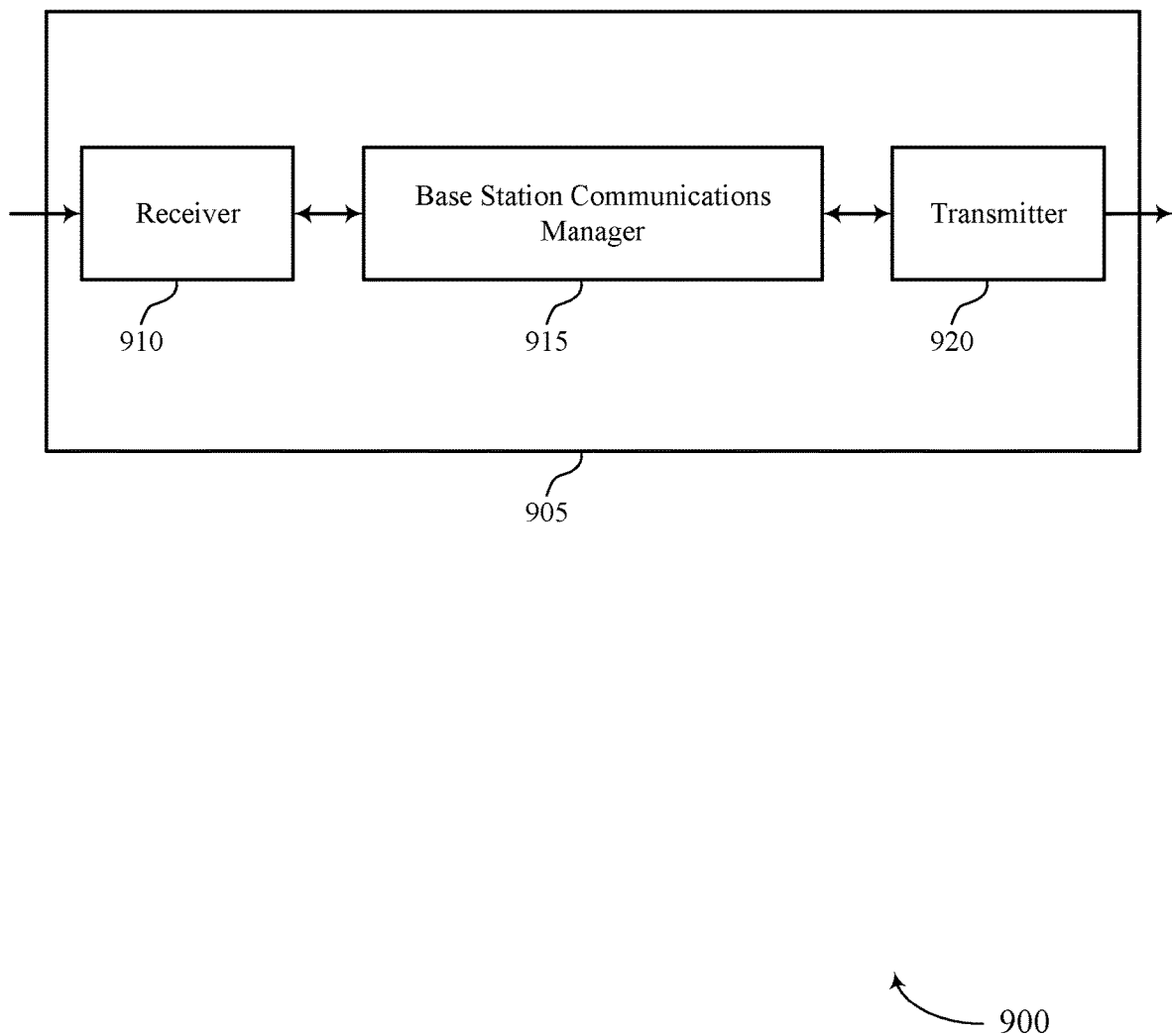
FIGS. 9 and 10 show block diagrams of devices that support MCSs for high band wireless communications in accordance with one or more aspects of the present disclosure.

FIG. 9 shows a block diagram 900 of a device 905 that supports MCSs for high band wireless communications in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to MCSs for high band wireless communications). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may determine a frequency band available for a random access procedure between the base station and a UE, determine an SCS associated with the frequency band, select, from a set of MCSs, an MCS for a random access message of the random access procedure based on the frequency band and the SCS associated with the frequency band, and transmit, to the UE, an indication of the selected MCS for the random access message. The base station communications manager 915 may be an example of aspects of the base station communications manager 1210 described herein.

Additionally or alternatively, the base station communications manager 915 may transmit an indication of an MCS for a random access message of a random access procedure based on a frequency band for the random access procedure and an SCS associated with the frequency band and receive, from the UE, the random access message based on the MCS. The base station communications manager 915 may be an example of aspects of the base station communications manager 1210 described herein.

The base station communications manager 915 may be an example of means for performing various aspects of managing smart repeaters as described herein. The base station communications manager 915, or its sub-components, may be implemented in hardware (e.g., in communications management circuitry). The circuitry may comprise of processor, DSP, an ASIC, an FPGA, or other programmable logic device, discrete gate or transistor logic, discrete hardware components, or any combination thereof designed to perform the functions described in the present disclosure.

In another implementation, the base station communications manager 915, or its sub-components, may be implemented in code (e.g., as communications management software or firmware) executed by a processor, or any combination thereof. If implemented in code executed by a processor, the functions of the base station communications manager 915, or its sub-components may be executed by a general-purpose processor, a DSP, an ASIC, an FPGA or other programmable logic device.

In some examples, the base station communications manager 915 may be configured to perform various operations (e.g., receiving, determining, selecting, transmitting) using or otherwise in cooperation with the receiver 910, the transmitter 920, or both.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

By including or configuring the base station communications manager 915 in accordance with examples as described herein, the device 905 (e.g., a processor controlling or otherwise coupled to the receiver 910, the base station communications manager 915, the transmitter 920, or a combination thereof) may support techniques for reduced processing, reduced power consumption, and more efficient utilization of communication resources by supporting frequency band and SCS based RACH procedures.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
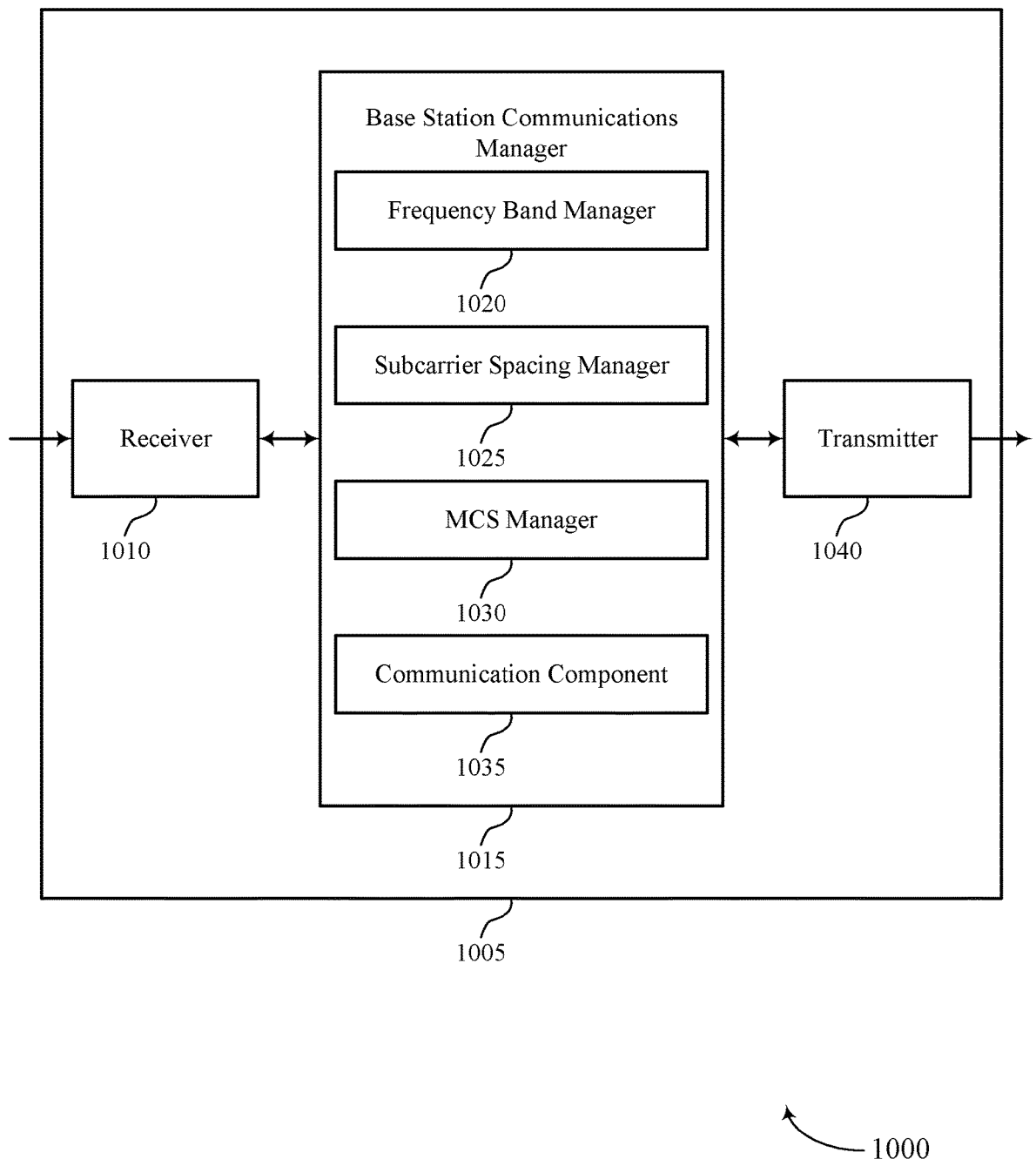

FIG. 10 shows a block diagram 1000 of a device 1005 that supports MCSs for high band wireless communications in accordance with aspects of the present disclosure. The device 1005 may be an example of aspects of a device 905, or a base station 105 as described herein. The device 1005 may include a receiver 1010, a base station communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to MCSs for high band wireless communications). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a frequency band manager 1020, an SCS manager 1025, an MCS manager 1030, and a communication component 1035. The base station communications manager 1015 may be an example of aspects of the base station communications manager 1210 described herein.

The frequency band manager 1020 may determine a frequency band available for a random access procedure between the base station and a UE.

The SCS manager 1025 may determine an SCS associated with the frequency band.

The MCS manager 1030 may select, from a set of MCSs, an MCS for a random access message of the random access procedure based on the frequency band and the SCS associated with the frequency band.

The communication component 1035 may transmit, to the UE, an indication of the selected MCS for the random access message.

Additionally or alternatively, the MCS manager 1030 may transmit an indication of an MCS for a random access message of a random access procedure based on a frequency band for the random access procedure and an SCS associated with the frequency band. The communication component 1035 may receive, from the UE, the random access message based on the MCS.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
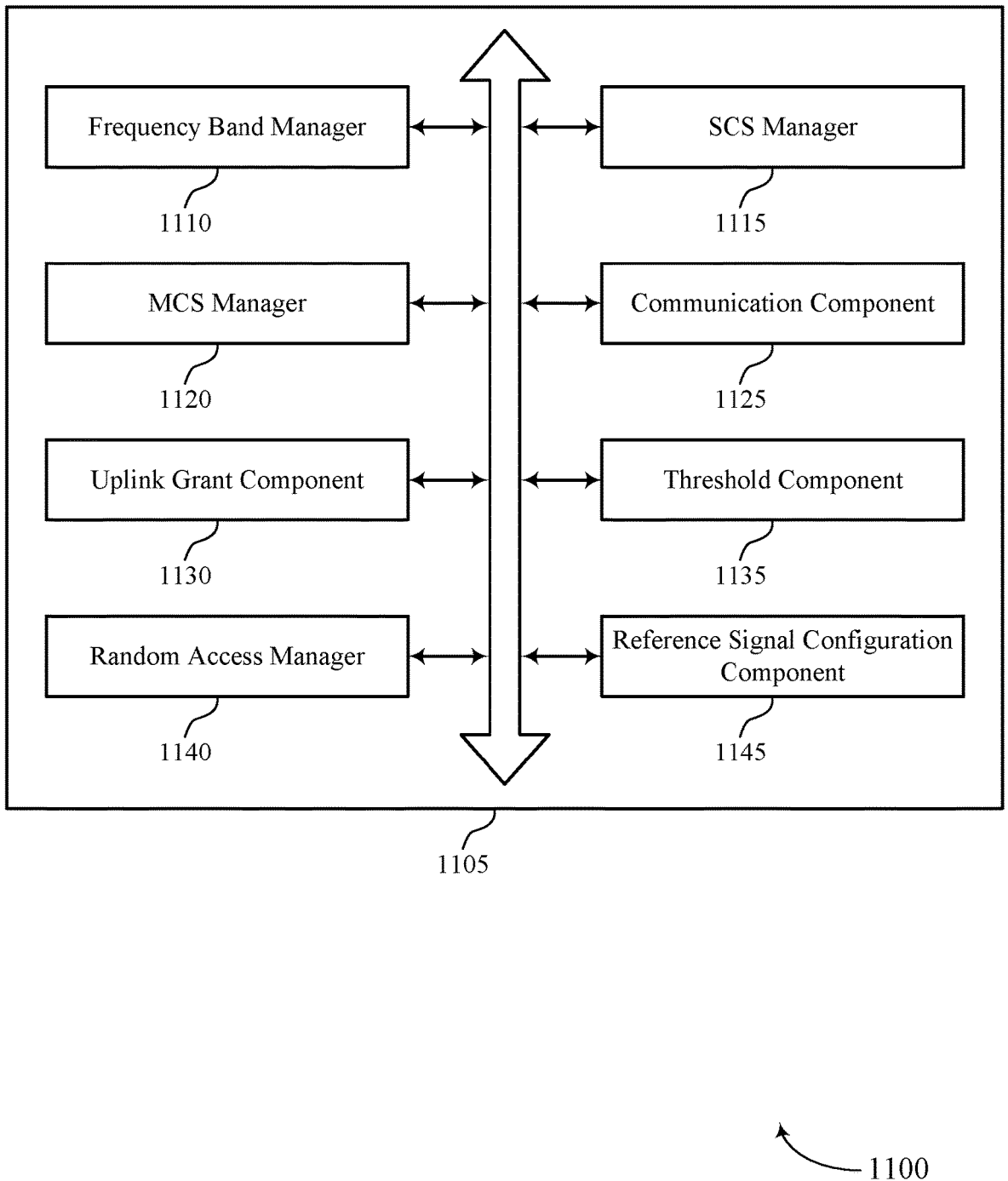
FIG. 11 shows a block diagram of a communications manager that supports MCSs for high band wireless communications in accordance with one or more aspects of the present disclosure.

FIG. 11 shows a block diagram 1100 of a base station communications manager 1105 that supports MCSs for high band wireless communications in accordance with aspects of the present disclosure. The base station communications manager 1105 may be an example of aspects of a base station communications manager 1015, a base station communications manager 1015, or a base station communications manager 1210 described herein. The base station communications manager 1105 may include a frequency band manager 1110, an SCS manager 1115, an MCS manager 1120, a communication component 1125, an uplink grant component 1130, a threshold component 1135, a random access manager 1140, and a reference signal configuration component 1145. Each of these modules may communicate, directly or indirectly, with one another (e.g., via one or more buses).

The frequency band manager 1110 may determine a frequency band available for a random access procedure between the base station and a UE.

The SCS manager 1115 may determine an SCS associated with the frequency band.

The MCS manager 1120 may select, from a set of MCSs, an MCS for a random access message of the random access procedure based on the frequency band and the SCS associated with the frequency band.

The communication component 1125 may transmit, to the UE, an indication of the selected MCS for the random access message. In some examples, the communication component 1125 may receive, from the UE and in response to the indication of the selected MCS, the random access message via a RACH of the frequency band in accordance with the SCS and selected MCS. In some examples, the communication component 1125 may receive the random access message from the UE in accordance with a random access preamble via a random access occasion based on the association.

The uplink grant component 1130 may transmit an uplink grant that includes a set of bits for conveying the indication of the MCS, where the set of bits includes at least one reserved bit independent of conveying the indication of the MCS. In some cases, the at least one reserved bit is associated with DMRS multiplexing for the random access message. In some cases, the at least one reserved bit corresponds to a transport block size scaling value for the random access message.

The threshold component 1135 may determine a threshold MCS based on the frequency band and the SCS associated with the frequency band, where the selected MCS satisfies the threshold MCS. In some cases, the threshold MCS includes one of a QPSK modulation or a 16 QAM.

The random access manager 1140 may transmit, to the UE, an association between a set of random access preambles, a set of random access occasions, and a set of reference signal configurations.

The reference signal configuration component 1145 may determine a reference signal configuration of the set of reference signal configurations based on the random access preamble and the random access occasion. In some examples, the reference signal configuration component 1145 may receive an indication of a UE preference for a reference signal configuration for phase tracking based on the selected MCS. In some examples, the reference signal configuration component 1145 may determine the reference signal configuration for a phase tracking reference signal for the UE based on the UE preference.

Additionally or alternatively, the MCS manager 1120 may be configured as or otherwise support a means for transmitting an indication of an MCS for a random access message of a random access procedure based on a frequency band for the random access procedure and an SCS associated with the frequency band. The communication component 1125 may be configured as or otherwise support a means for receiving, from the UE, the random access message based on the MCS.

In some examples, the communication component 1125 may be configured as or otherwise support a means for receiving, in response to the indication of the MCS, the random access message via a RACH of the frequency band in accordance with the SCS and the MCS.

In some examples, the uplink grant component 1130 may be configured as or otherwise support a means for transmitting an uplink grant that includes a set of bits for conveying the indication of the MCS, where the set of bits includes at least one reserved bit independent of conveying the indication of the MCS.

In some examples, the at least one reserved bit is associated with DMRS multiplexing for the random access message.

In some examples, the at least one reserved bit corresponds to a transport block size scaling value for the random access message.

In some examples, the MCS satisfies a threshold MCS that is based on the frequency band and the SCS associated with the frequency band.

In some examples, the threshold MCS includes one of a QPSK modulation or a 16 QAM.

In some examples, the random access manager 1140 may be configured as or otherwise support a means for transmitting, to the UE, an association between a set of random access preambles, a set of random access occasions, and a set of reference signal configurations. In some examples, the communication component 1125 may be configured as or otherwise support a means for receiving the random access message from the UE in accordance with a random access preamble via a random access occasion based on the association. In some examples, the reference signal configuration component 1145 may be configured as or otherwise support a means for selecting a reference signal configuration from the set of reference signal configurations based on the random access preamble and the random access occasion.

In some examples, the reference signal configuration component 1145 may be configured as or otherwise support a means for receiving an indication of a UE preference for a reference signal configuration for phase tracking based on the MCS. In some examples, the reference signal configuration component 1145 may be configured as or otherwise support a means for selecting the reference signal configuration for a phase tracking reference signal for the UE from a set of reference signal configurations based on the UE preference.

Figure 12:
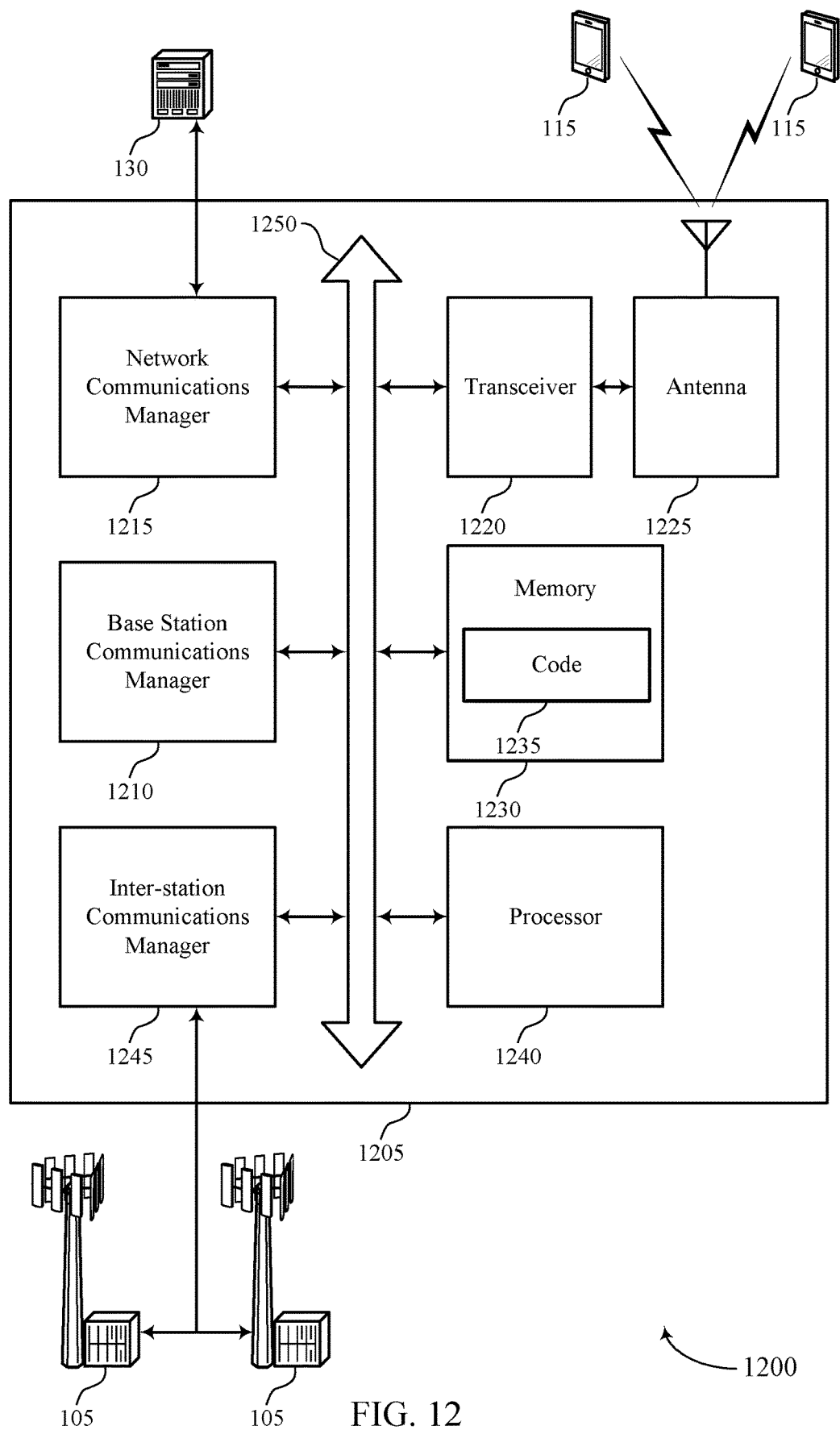
FIG. 12 shows a diagram of a system including a device that supports MCSs for high band wireless communications in accordance with one or more aspects of the present disclosure.

FIG. 12 shows a diagram of a system 1200 including a device 1205 that supports MCSs for high band wireless communications in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may determine a frequency band available for a random access procedure between the base station and a UE, determine an SCS associated with the frequency band, select, from a set of MCSs, an MCS for a random access message of the random access procedure based on the frequency band and the SCS associated with the frequency band, and transmit, to the UE, an indication of the selected MCS for the random access message.

The base station communications manager 1210 may transmit an indication of an MCS for a random access message of a random access procedure based on a frequency band for the random access procedure and an SCS associated with the frequency band and receive, from the UE, the random access message based on the MCS.

By including or configuring the base station communications manager 1210 in accordance with examples as described herein, the device 1205 may support techniques for increased reliability, data rates, spectral efficiency, resource usage, coordination between devices, battery life, and processing capability and reduced latency and power consumption, among other benefits.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting MCSs for high band wireless communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
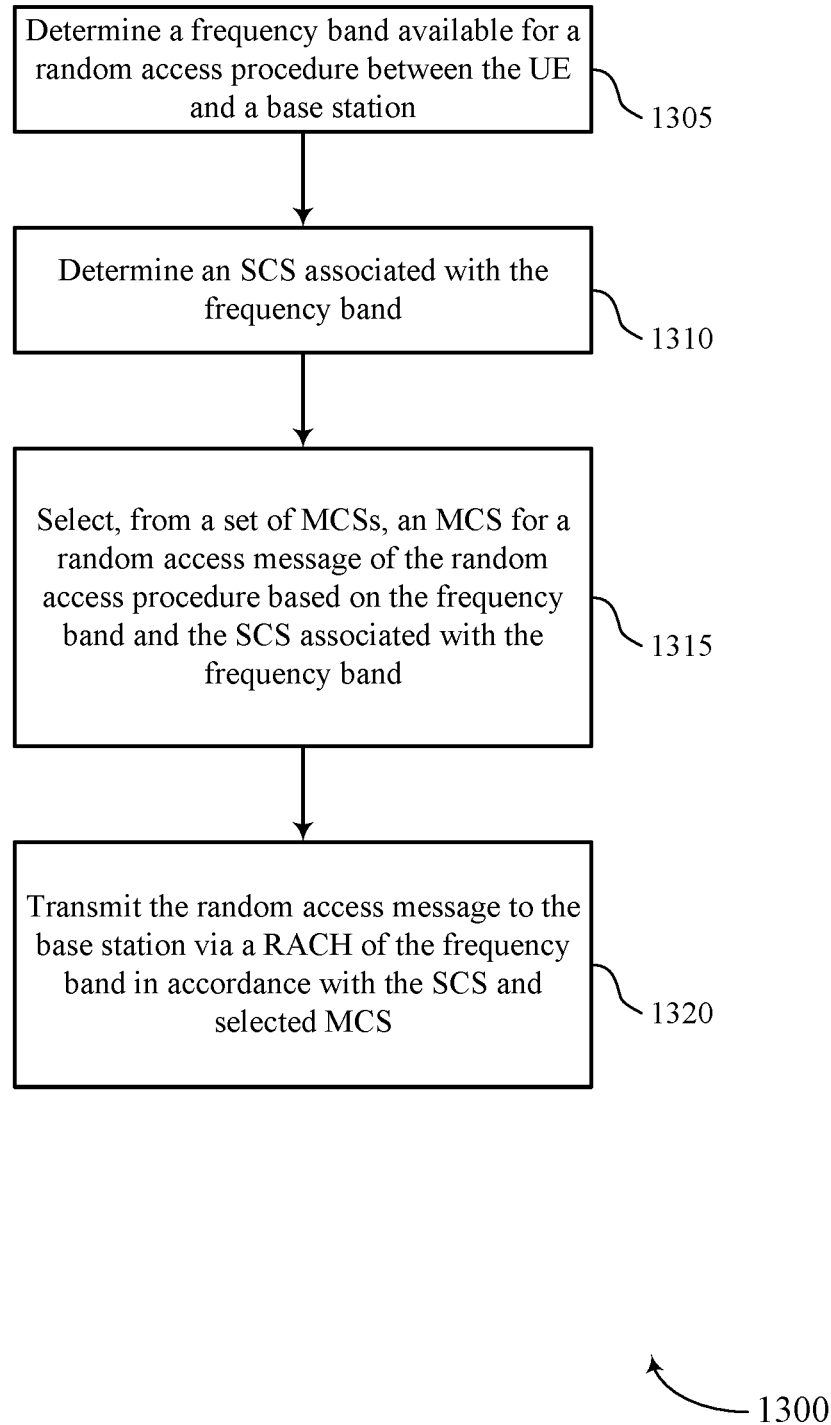
FIGS. 13 through 23 show flowcharts illustrating methods that support MCSs for high band wireless communications in accordance with one or more aspects of the present disclosure.

FIG. 13 shows a flowchart illustrating a method 1300 that supports MCSs for high band wireless communications in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may determine a frequency band available for a random access procedure between the UE and a base station. The operations of 1305 may be performed according to the methods described herein. In some examples, aspects of the operations of 1305 may be performed by a frequency band manager as described with reference to FIGS. 5 through 8.

At 1310, the UE may determine an SCS associated with the frequency band. The operations of 1310 may be performed according to the methods described herein. In some examples, aspects of the operations of 1310 may be performed by an SCS manager as described with reference to FIGS. 5 through 8.

At 1315, the UE may select, from a set of MCSs, an MCS for a random access message of the random access procedure based on the frequency band and the SCS associated with the frequency band. The operations of 1315 may be performed according to the methods described herein. In some examples, aspects of the operations of 1315 may be performed by an MCS manager as described with reference to FIGS. 5 through 8.

At 1320, the UE may transmit the random access message to the base station via a RACH of the frequency band in accordance with the SCS and selected MCS. The operations of 1320 may be performed according to the methods described herein. In some examples, aspects of the operations of 1320 may be performed by a communication component as described with reference to FIGS. 5 through 8.

Figure 14:
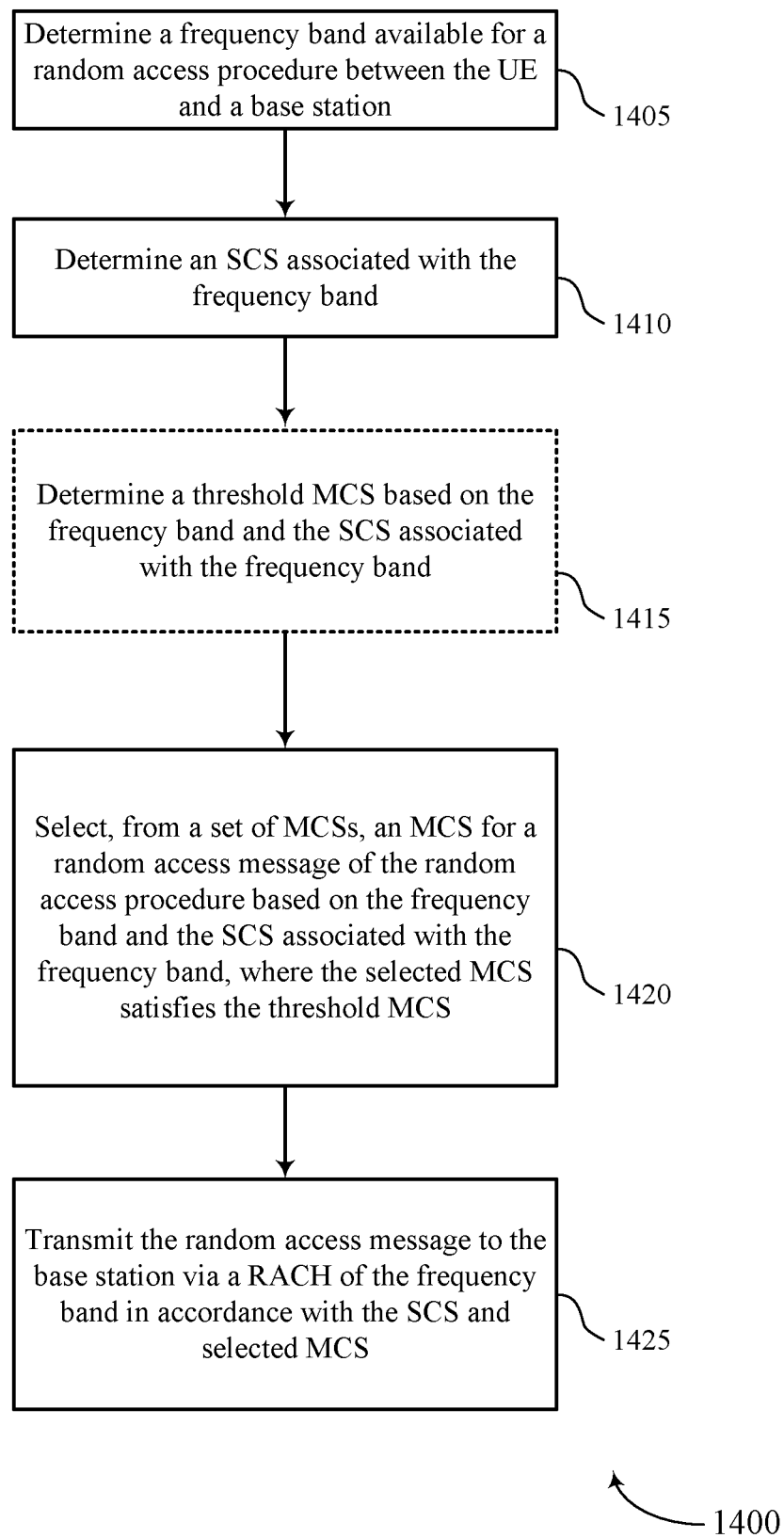

FIG. 14 shows a flowchart illustrating a method 1400 that supports MCSs for high band wireless communications in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may determine a frequency band available for a random access procedure between the UE and a base station. The operations of 1405 may be performed according to the methods described herein. In some examples, aspects of the operations of 1405 may be performed by a frequency band manager as described with reference to FIGS. 5 through 8.

At 1410, the UE may determine an SCS associated with the frequency band. The operations of 1410 may be performed according to the methods described herein. In some examples, aspects of the operations of 1410 may be performed by an SCS manager as described with reference to FIGS. 5 through 8.

At 1415, the UE may determine a threshold MCS based on the frequency band and the SCS associated with the frequency band. The operations of 1415 may be performed according to the methods described herein. In some examples, aspects of the operations of 1415 may be performed by a threshold component as described with reference to FIGS. 5 through 8.

At 1420, the UE may select, from a set of MCSs, an MCS for a random access message of the random access procedure based on the frequency band and the SCS associated with the frequency band, where the selected MCS satisfies the threshold MCS. The operations of 1420 may be performed according to the methods described herein. In some examples, aspects of the operations of 1420 may be performed by an MCS manager as described with reference to FIGS. 5 through 8.

At 1425, the UE may transmit the random access message to the base station via a RACH of the frequency band in accordance with the SCS and selected MCS. The operations of 1425 may be performed according to the methods described herein. In some examples, aspects of the operations of 1425 may be performed by a communication component as described with reference to FIGS. 5 through 8.

Figure 15:
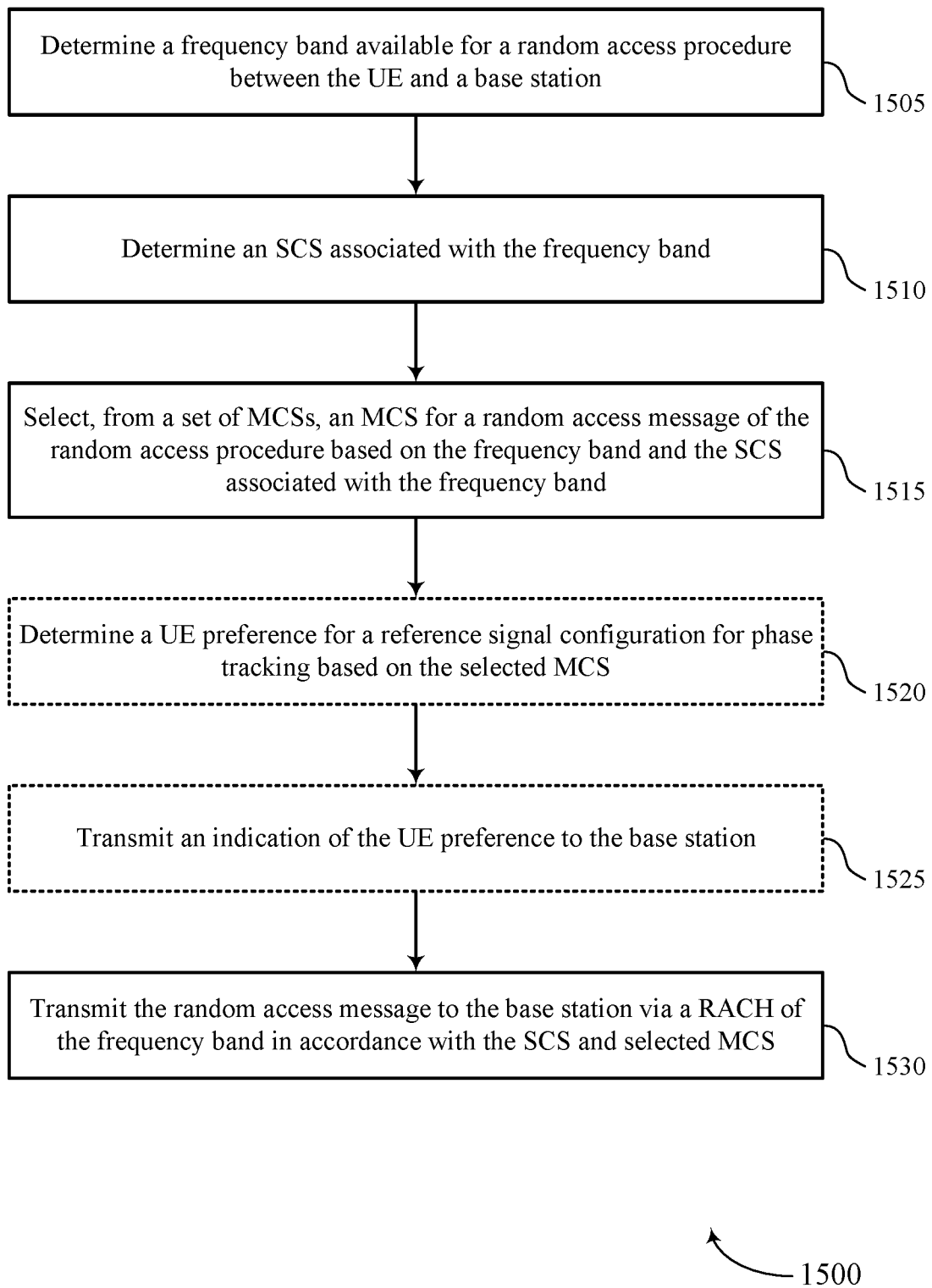

FIG. 15 shows a flowchart illustrating a method 1500 that supports MCSs for high band wireless communications in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may determine a frequency band available for a random access procedure between the UE and a base station. The operations of 1505 may be performed according to the methods described herein. In some examples, aspects of the operations of 1505 may be performed by a frequency band manager as described with reference to FIGS. 5 through 8.

At 1510, the UE may determine an SCS associated with the frequency band. The operations of 1510 may be performed according to the methods described herein. In some examples, aspects of the operations of 1510 may be performed by an SCS manager as described with reference to FIGS. 5 through 8.

At 1515, the UE may select, from a set of MCSs, an MCS for a random access message of the random access procedure based on the frequency band and the SCS associated with the frequency band. The operations of 1515 may be performed according to the methods described herein. In some examples, aspects of the operations of 1515 may be performed by an MCS manager as described with reference to FIGS. 5 through 8.

At 1520, the UE may determine a UE preference for a reference signal configuration for phase tracking based on the selected MCS. The operations of 1520 may be performed according to the methods described herein. In some examples, aspects of the operations of 1520 may be performed by a UE preference manager as described with reference to FIGS. 5 through 8.

At 1525, the UE may transmit an indication of the UE preference to the base station. The operations of 1525 may be performed according to the methods described herein. In some examples, aspects of the operations of 1525 may be performed by a communication component as described with reference to FIGS. 5 through 8.

At 1530, the UE may transmit the random access message to the base station via a RACH of the frequency band in accordance with the SCS and selected MCS. The operations of 1530 may be performed according to the methods described herein. In some examples, aspects of the operations of 1530 may be performed by a communication component as described with reference to FIGS. 5 through 8.

Figure 16:
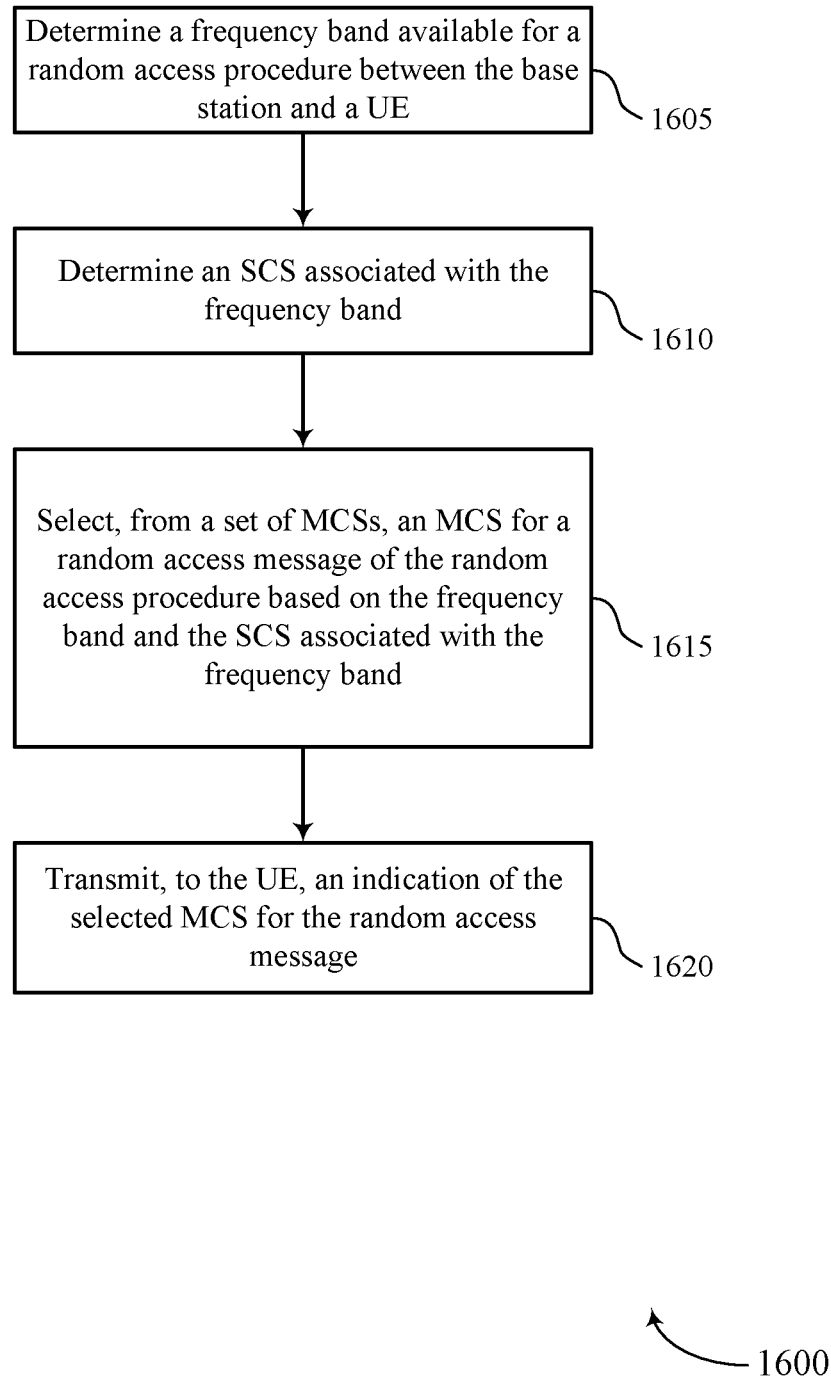

FIG. 16 shows a flowchart illustrating a method 1600 that supports MCSs for high band wireless communications in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may determine a frequency band available for a random access procedure between the base station and a UE. The operations of 1605 may be performed according to the methods described herein. In some examples, aspects of the operations of 1605 may be performed by a frequency band manager as described with reference to FIGS. 9 through 12.

At 1610, the base station may determine an SCS associated with the frequency band. The operations of 1610 may be performed according to the methods described herein. In some examples, aspects of the operations of 1610 may be performed by an SCS manager as described with reference to FIGS. 9 through 12.

At 1615, the base station may select, from a set of MCSs, an MCS for a random access message of the random access procedure based on the frequency band and the SCS associated with the frequency band. The operations of 1615 may be performed according to the methods described herein. In some examples, aspects of the operations of 1615 may be performed by an MCS manager as described with reference to FIGS. 9 through 12.

At 1620, the base station may transmit, to the UE, an indication of the selected MCS for the random access message. The operations of 1620 may be performed according to the methods described herein. In some examples, aspects of the operations of 1620 may be performed by a communication component as described with reference to FIGS. 9 through 12.

Figure 17:
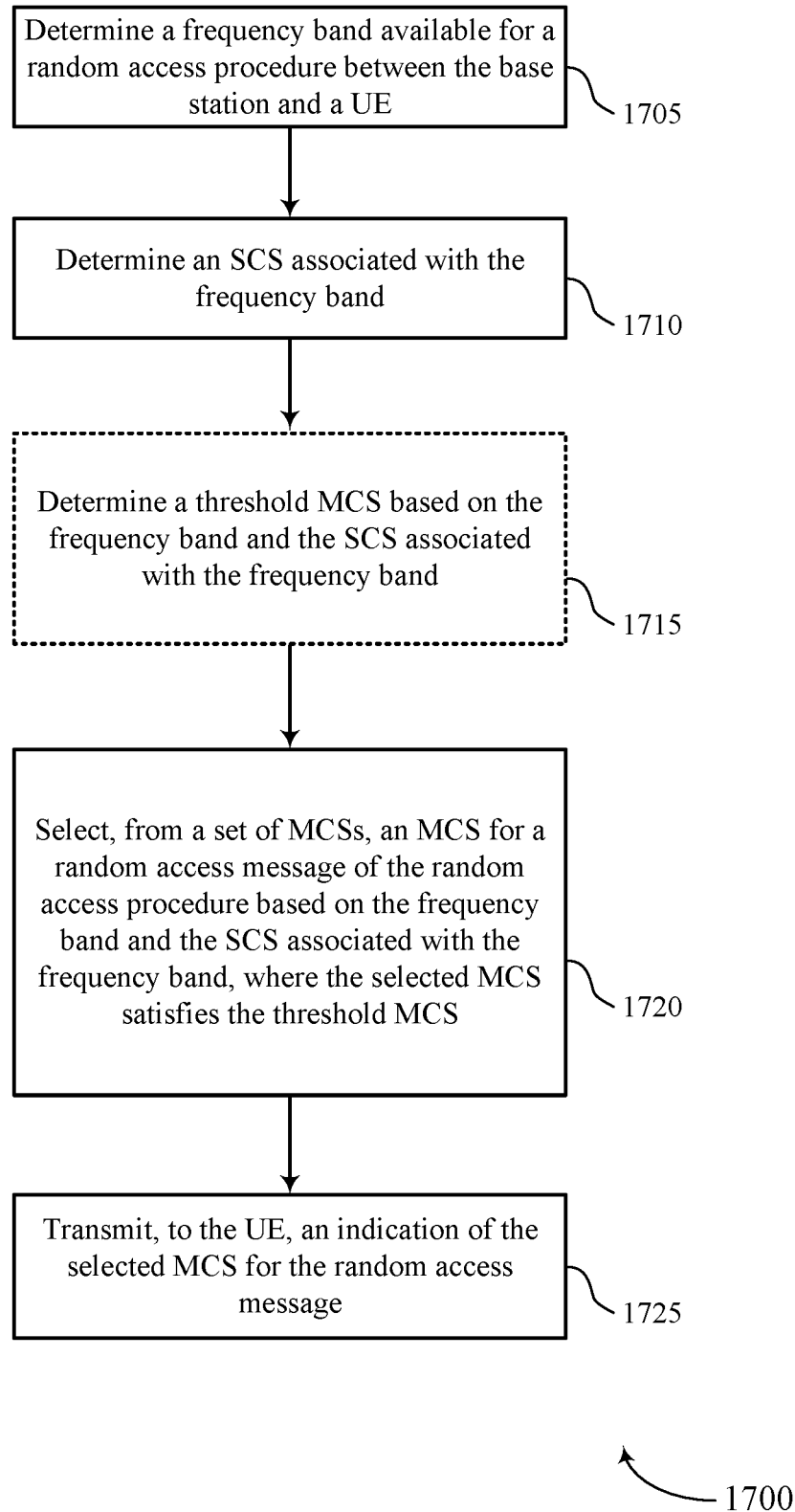

FIG. 17 shows a flowchart illustrating a method 1700 that supports MCSs for high band wireless communications in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1705, the base station may determine a frequency band available for a random access procedure between the base station and a UE. The operations of 1705 may be performed according to the methods described herein. In some examples, aspects of the operations of 1705 may be performed by a frequency band manager as described with reference to FIGS. 9 through 12.

At 1710, the base station may determine an SCS associated with the frequency band. The operations of 1710 may be performed according to the methods described herein. In some examples, aspects of the operations of 1710 may be performed by an SCS manager as described with reference to FIGS. 9 through 12.

At 1715, the base station may determine a threshold MCS based on the frequency band and the SCS associated with the frequency band. The operations of 1715 may be performed according to the methods described herein. In some examples, aspects of the operations of 1715 may be performed by a threshold component as described with reference to FIGS. 9 through 12.

At 1720, the base station may select, from a set of MCSs, an MCS for a random access message of the random access procedure based on the frequency band and the SCS associated with the frequency band, where the selected MCS satisfies the threshold MCS. The operations of 1720 may be performed according to the methods described herein. In some examples, aspects of the operations of 1720 may be performed by an MCS manager as described with reference to FIGS. 9 through 12.

At 1725, the base station may transmit, to the UE, an indication of the selected MCS for the random access message. The operations of 1725 may be performed according to the methods described herein. In some examples, aspects of the operations of 1725 may be performed by a communication component as described with reference to FIGS. 9 through 12.

Figure 18:
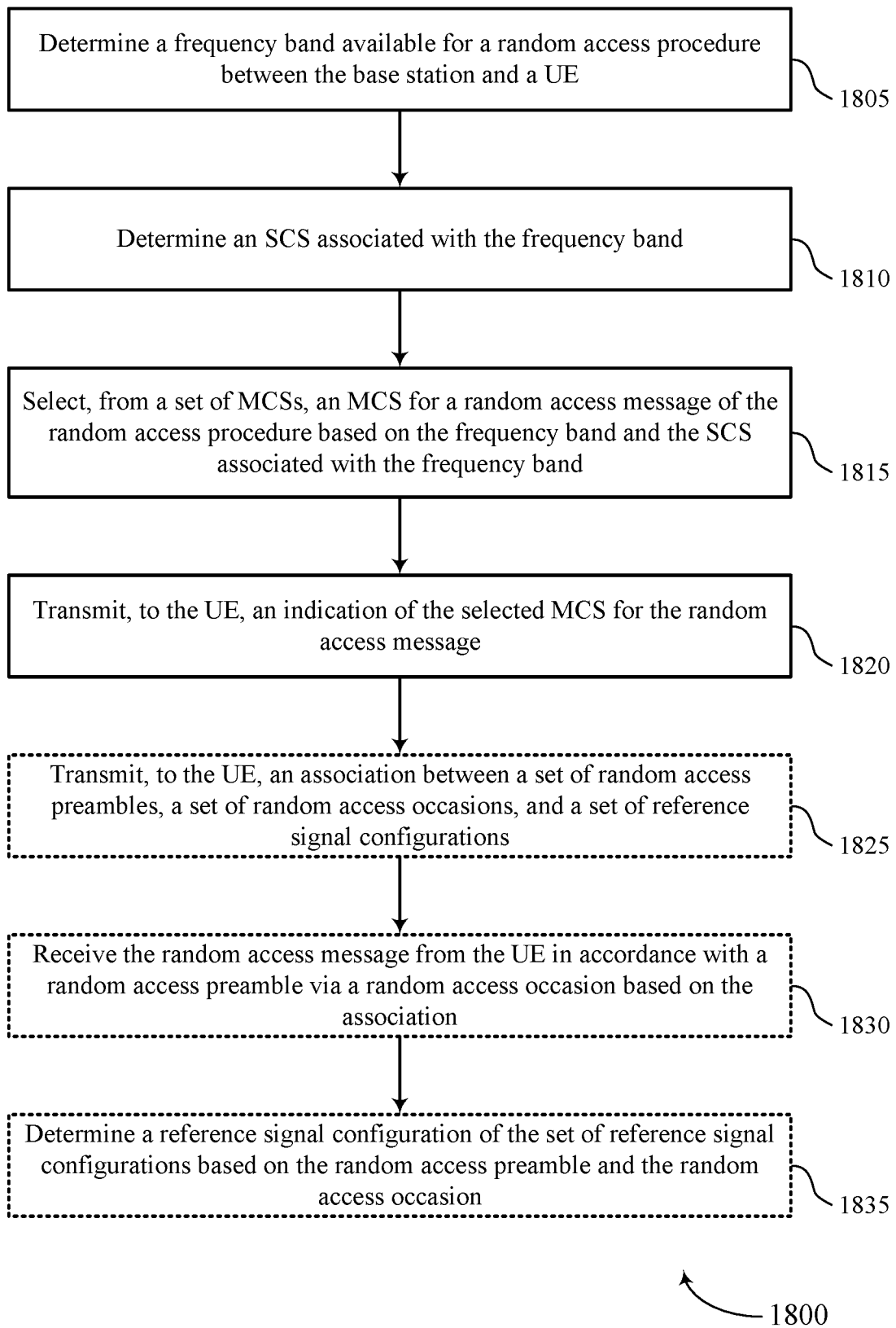

FIG. 18 shows a flowchart illustrating a method 1800 that supports MCSs for high band wireless communications in accordance with aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1805, the base station may determine a frequency band available for a random access procedure between the base station and a UE. The operations of 1805 may be performed according to the methods described herein. In some examples, aspects of the operations of 1805 may be performed by a frequency band manager as described with reference to FIGS. 9 through 12.

At 1810, the base station may determine an SCS associated with the frequency band. The operations of 1810 may be performed according to the methods described herein. In some examples, aspects of the operations of 1810 may be performed by an SCS manager as described with reference to FIGS. 9 through 12.

At 1815, the base station may select, from a set of MCSs, an MCS for a random access message of the random access procedure based on the frequency band and the SCS associated with the frequency band. The operations of 1815 may be performed according to the methods described herein. In some examples, aspects of the operations of 1815 may be performed by an MCS manager as described with reference to FIGS. 9 through 12.

At 1820, the base station may transmit, to the UE, an indication of the selected MCS for the random access message. The operations of 1820 may be performed according to the methods described herein. In some examples, aspects of the operations of 1820 may be performed by a communication component as described with reference to FIGS. 9 through 12.

At 1825, the base station may transmit, to the UE, an association between a set of random access preambles, a set of random access occasions, and a set of reference signal configurations. The operations of 1825 may be performed according to the methods described herein. In some examples, aspects of the operations of 1825 may be performed by a random access manager as described with reference to FIGS. 9 through 12.

At 1830, the base station may receive the random access message from the UE in accordance with a random access preamble via a random access occasion based on the association. The operations of 1830 may be performed according to the methods described herein. In some examples, aspects of the operations of 1830 may be performed by a communication component as described with reference to FIGS. 9 through 12.

At 1835, the base station may determine a reference signal configuration of the set of reference signal configurations based on the random access preamble and the random access occasion. The operations of 1835 may be performed according to the methods described herein. In some examples, aspects of the operations of 1835 may be performed by a reference signal configuration component as described with reference to FIGS. 9 through 12.

Figure 19:
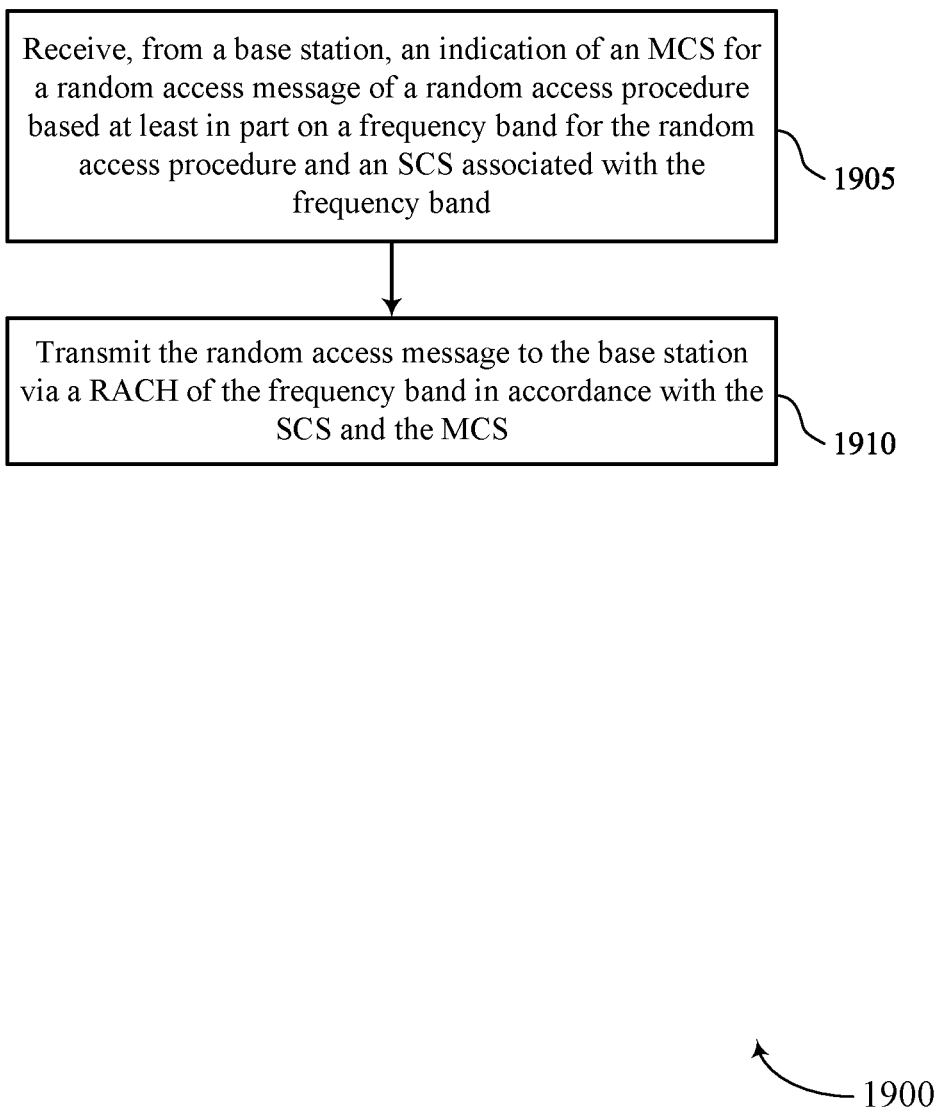

FIG. 19 shows a flowchart illustrating a method 1900 that supports modulation and coding schemes for high band wireless communications in accordance with aspects of the present disclosure. The operations of the method 1900 may be implemented by a UE or its components as described herein. For example, the operations of the method 1900 may be performed by a UE communications manager as described with reference to FIGS. 5 through 8. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, an indication of an MCS for a random access message of a random access procedure based on a frequency band for the random access procedure and an SCS associated with the frequency band. The operations of 1905 may be performed in accordance with examples as disclosed herein. In some examples, aspects of the operations of 1905 may be performed by an MCS manager as described with reference to FIGS. 5 through 8.

At 1910, the method may include transmitting the random access message to the base station via a RACH of the frequency band in accordance with the SCS and the MCS. The operations of 1910 may be performed in accordance with examples as disclosed herein. In some examples, aspects of the operations of 1910 may be performed by a communication component as described with reference to FIGS. 5 through 8.

Figure 20:
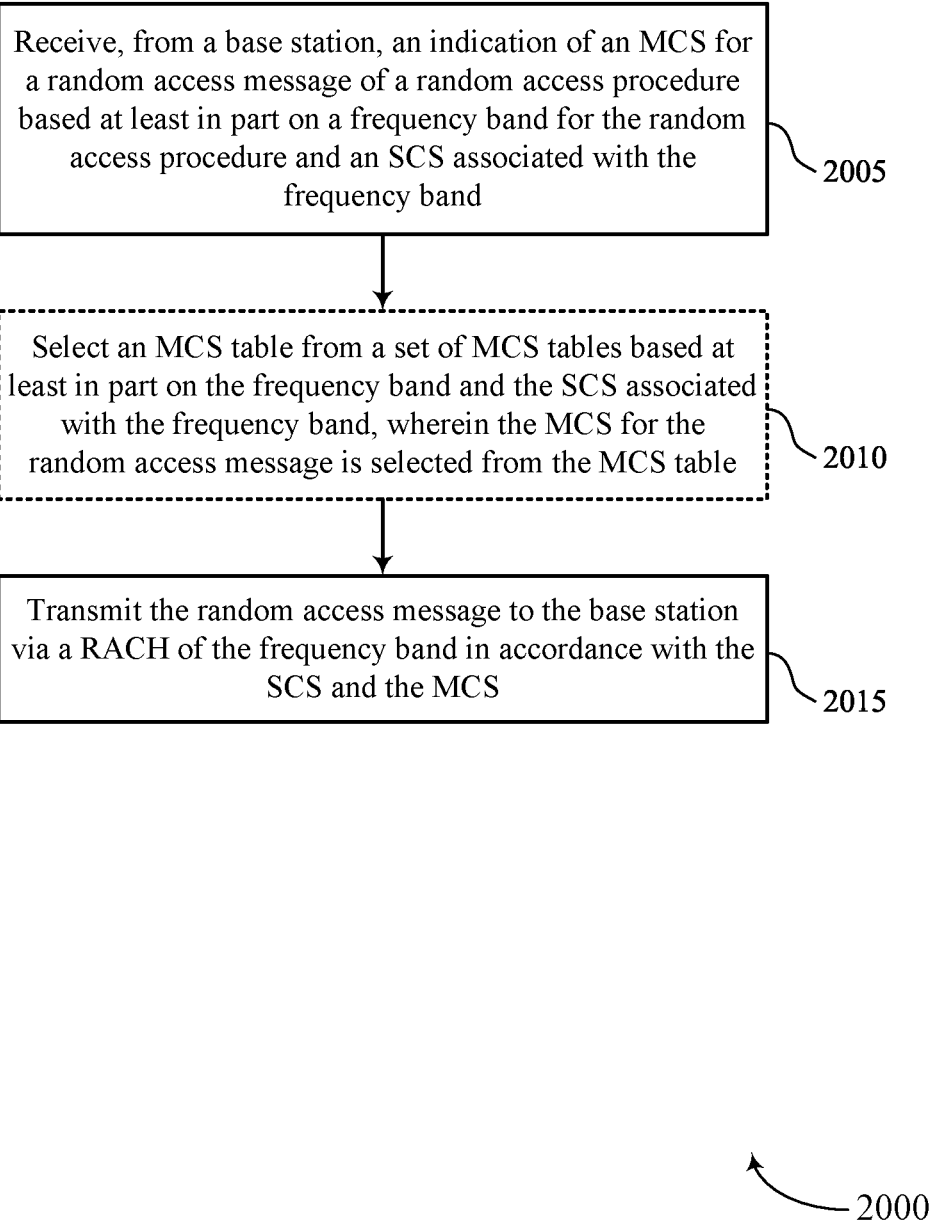

FIG. 20 shows a flowchart illustrating a method 2000 that supports modulation and coding schemes for high band wireless communications in accordance with aspects of the present disclosure. The operations of the method 2000 may be implemented by a UE or its components as described herein. For example, the operations of the method 2000 may be performed by a UE communications manager as described with reference to FIGS. 5 through 8. In some examples, a UE may execute a set of instructions to control the functional elements of the UE to perform the described functions. Additionally or alternatively, the UE may perform aspects of the described functions using special-purpose hardware.

At 2005, the method may include receiving, from a base station, an indication of an MCS for a random access message of a random access procedure based on a frequency band for the random access procedure and an SCS associated with the frequency band. The operations of 2005 may be performed in accordance with examples as disclosed herein. In some examples, aspects of the operations of 2005 may be performed by an MCS manager as described with reference to FIGS. 5 through 8.

At 2010, the method may optionally include selecting an MCS table from a set of MCS tables based on the frequency band and the SCS associated with the frequency band, where the MCS for the random access message is selected from the MCS table. The operations of 2010 may be performed in accordance with examples as disclosed herein. In some examples, aspects of the operations of 2010 may be performed by an MCS manager as described with reference to FIGS. 5 through 8.

At 2015, the method may include transmitting the random access message to the base station via a RACH of the frequency band in accordance with the SCS and the MCS. The operations of 2015 may be performed in accordance with examples as disclosed herein. In some examples, aspects of the operations of 2015 may be performed by a communication component as described with reference to FIGS. 5 through 8.

Figure 21:
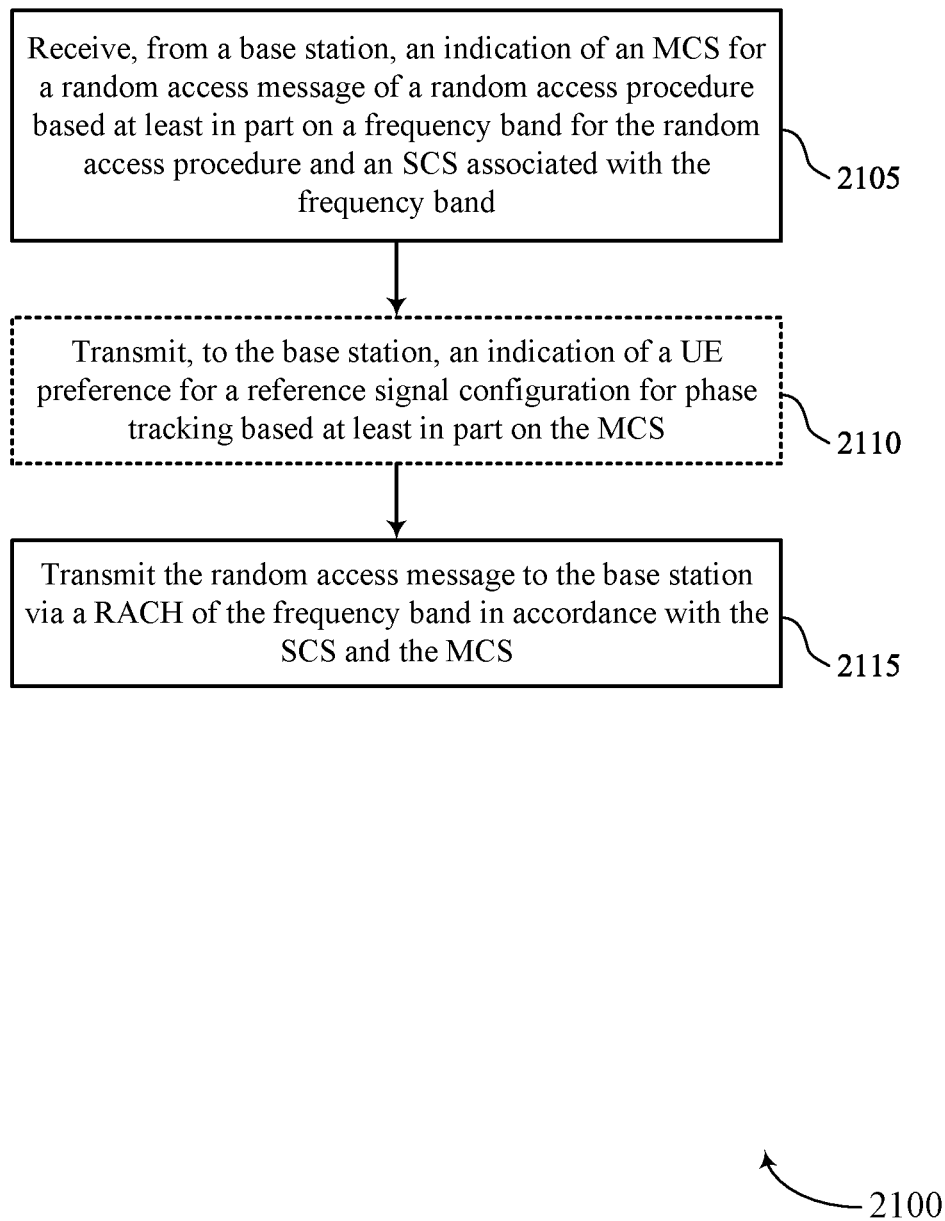

FIG. 21 shows a flowchart illustrating a method 2100 that supports modulation and coding schemes for high band wireless communications in accordance with aspects of the present disclosure. The operations of the method 2100 may be implemented by a UE or its components as described herein. For example, the operations of the method 2100 may be performed by a UE communications manager as described with reference to FIGS. 5 through 8. In some examples, a UE may execute a set of instructions to control the functional elements of the UE to perform the described functions. Additionally or alternatively, the UE may perform aspects of the described functions using special-purpose hardware.

At 2105, the method may include receiving, from a base station, an indication of an MCS for a random access message of a random access procedure based on a frequency band for the random access procedure and an SCS associated with the frequency band. The operations of 2105 may be performed in accordance with examples as disclosed herein. In some examples, aspects of the operations of 2105 may be performed by an MCS manager as described with reference to FIGS. 5 through 8.

At 2110, the method may optionally include transmitting, to the base station, an indication of a UE preference for a reference signal configuration for phase tracking based on the MCS. The operations of 2110 may be performed in accordance with examples as disclosed herein. In some examples, aspects of the operations of 2110 may be performed by a UE preference manager as described with reference to FIGS. 5 through 8.

At 2115, the method may include transmitting the random access message to the base station via a RACH of the frequency band in accordance with the SCS and the MCS. The operations of 2115 may be performed in accordance with examples as disclosed herein. In some examples, aspects of the operations of 2115 may be performed by a communication component as described with reference to FIGS. 5 through 8.

Figure 22:
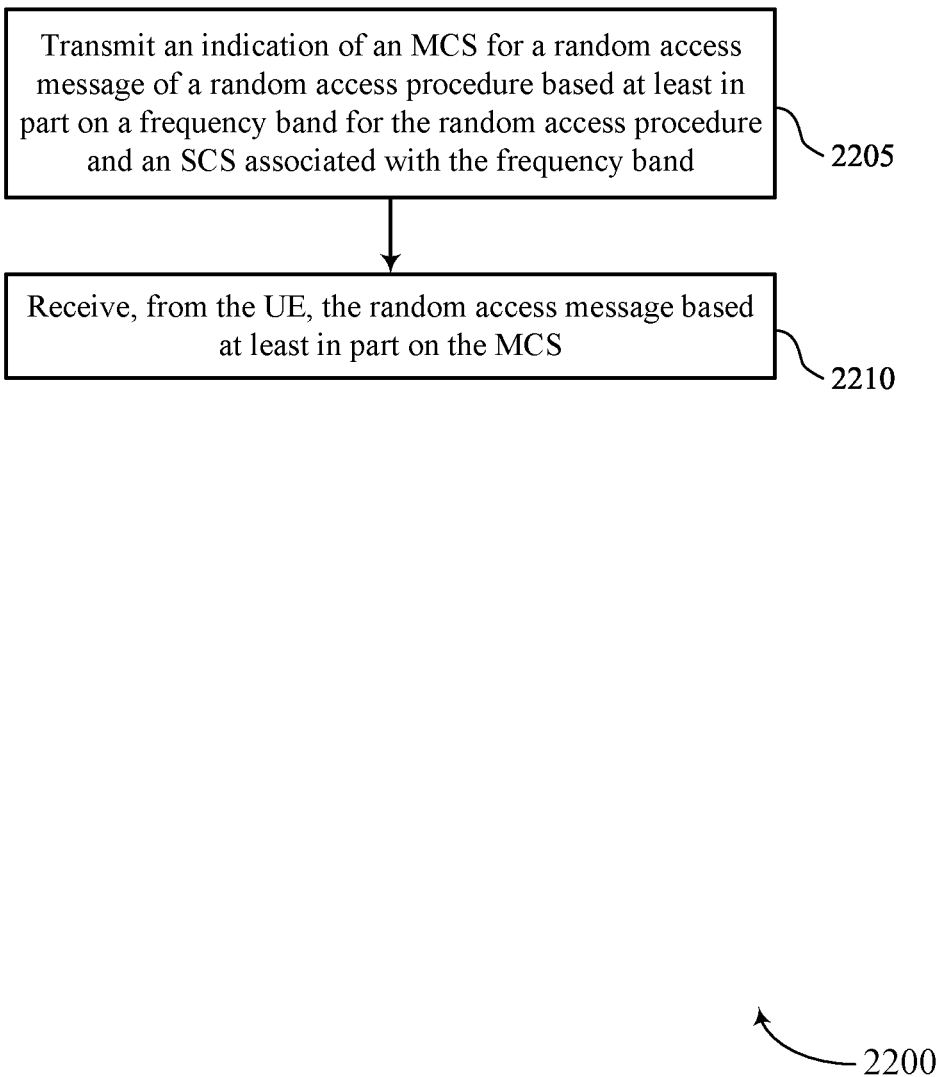

FIG. 22 shows a flowchart illustrating a method 2200 that supports modulation and coding schemes for high band wireless communications in accordance with aspects of the present disclosure. The operations of the method 2200 may be implemented by a base station or its components as described herein. For example, the operations of the method 2200 may be performed by a base station communications manager as described with reference to FIGS. 9 through 12. In some examples, a base station may execute a set of instructions to control the functional elements of the base station to perform the described functions. Additionally or alternatively, the base station may perform aspects of the described functions using special-purpose hardware.

At 2205, the method may include transmitting an indication of an MCS for a random access message of a random access procedure based on a frequency band for the random access procedure and an SCS associated with the frequency band. The operations of 205 may be performed in accordance with examples as disclosed herein. In some examples, aspects of the operations of 2205 may be performed by an MCS manager as described with reference to FIGS. 9 through 12.

At 2210, the method may include receiving, from the UE, the random access message based on the MCS. The operations of 2210 may be performed in accordance with examples as disclosed herein. In some examples, aspects of the operations of 2210 may be performed by a communication component as described with reference to FIGS. 9 through 12.

Figure 23:
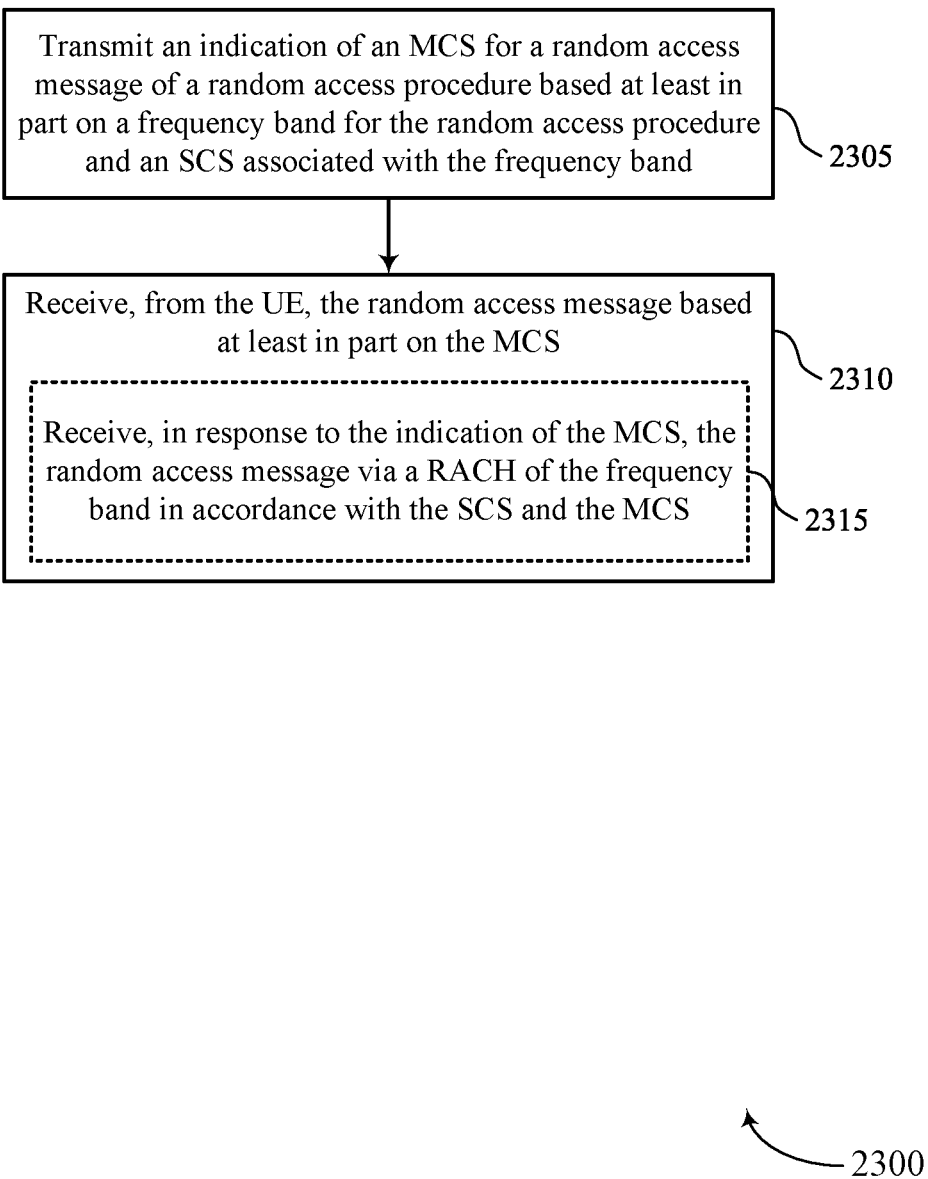

FIG. 23 shows a flowchart illustrating a method 2300 that supports modulation and coding schemes for high band wireless communications in accordance with aspects of the present disclosure. The operations of the method 2300 may be implemented by a base station or its components as described herein. For example, the operations of the method 2300 may be performed by a base station communications manager as described with reference to FIGS. 9 through 12. In some examples, a base station may execute a set of instructions to control the functional elements of the base station to perform the described functions. Additionally or alternatively, the base station may perform aspects of the described functions using special-purpose hardware.

At 2305, the method may include transmitting an indication of an MCS for a random access message of a random access procedure based on a frequency band for the random access procedure and an SCS associated with the frequency band. The operations of 2305 may be performed in accordance with examples as disclosed herein. In some examples, aspects of the operations of 2305 may be performed by an MCS manager as described with reference to FIGS. 9 through 12.

At 2310, the method may include receiving, from the UE, the random access message based on the MCS. The operations of 2310 may be performed in accordance with examples as disclosed herein. In some examples, aspects of the operations of 2310 may be performed by a communication component as described with reference to FIGS. 9 through 12.

At 2315, to receive the random access message, the method may optionally include receiving, in response to the indication of the MCS, the random access message via a RACH of the frequency band in accordance with the SCS and the MCS. The operations of 2315 may be performed in accordance with examples as disclosed herein. In some examples, aspects of the operations of 2315 may be performed by a communication component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving, from a base station, an indication of an MCS for a random access message of a random access procedure based at least in part on a frequency band for the random access procedure and an SCS associated with the frequency band; and transmitting the random access message to the base station via a RACH of the frequency band in accordance with the SCS and the MCS.

Aspect 2: The method of aspect 1, further comprising: selecting an MCS table from a set of MCS tables based at least in part on the frequency band and the SCS associated with the frequency band, wherein the MCS for the random access message is selected from the MCS table.

Aspect 3: The method of aspect 2, wherein the MCS table comprises a set of MCSs having lower modulation orders relative to all other MCS tables of the set of MCS tables.

Aspect 4: The method of any of aspects 1 through 3, the receiving the indication comprising: receiving an uplink grant that comprises a set of bits for conveying the indication of the MCS, wherein the set of bits comprises at least one reserved bit independent of conveying the indication of the MCS.

Aspect 5: The method of aspect 4, wherein the at least one reserved bit is associated with DMRS multiplexing for the random access message.

Aspect 6: The method of aspect 4, wherein the at least one reserved bit corresponds to a transport block size scaling value for the random access message.

Aspect 7: The method of any of aspects 1 through 6, wherein the MCS satisfies a threshold MCS that is based at least in part on the frequency band and the SCS associated with the frequency band.

Aspect 8: The method of aspect 7, wherein the threshold MCS comprises one of a QPSK modulation or a 16 QAM.

Aspect 9: The method of any of aspects 1 through 8, further comprising: transmitting, to the base station, an indication of a UE preference for a reference signal configuration for phase tracking based at least in part on the MCS.

Aspect 10: The method of aspect 9, further comprising: transmitting one or more phase tracking reference signals in accordance with the reference signal configuration, wherein the one or more phase tracking reference signals are transmitted with the random access message.

Aspect 11: The method of any of aspects 9 through 10, further comprising: selecting the MCS based at least in part on the reference signal configuration.

Aspect 12: The method of any of aspects 9 through 11, the transmitting the random access message comprising: transmitting a random access preamble during a random access occasion based at least in part on the UE preference for the reference signal configuration.

Aspect 13: The method of aspect 12, further comprising: receiving an association between a set of random access preambles, a set of random access occasions, and a set of reference signal configurations; and selecting the random access preamble and the random access occasion based at least in part on a second reference signal configuration of the set of reference signal configurations corresponding to the reference signal configuration and the association.

Aspect 14: A method for wireless communications at a base station, comprising: transmitting an indication of an MCS for a random access message of a random access procedure based at least in part on a frequency band for the random access procedure and an SCS associated with the frequency band; and receiving, from the UE, the random access message based at least in part on the MCS.

Aspect 15: The method of aspect 14, the receiving the random access message comprising: receiving, in response to the indication of the MCS, the random access message via a RACH of the frequency band in accordance with the SCS and the MCS.

Aspect 16: The method of any of aspects 14 through 15, the transmitting the indication of the MCS comprising: transmitting an uplink grant that comprises a set of bits for conveying the indication of the MCS, wherein the set of bits comprises at least one reserved bit independent of conveying the indication of the MCS.

Aspect 17: The method of aspect 16, wherein the at least one reserved bit is associated with DMRS multiplexing for the random access message.

Aspect 18: The method of aspect 16, wherein the at least one reserved bit corresponds to a transport block size scaling value for the random access message.

Aspect 19: The method of any of aspects 14 through 18, wherein the MCS satisfies a threshold MCS that is based at least in part on the frequency band and the SCS associated with the frequency band.

Aspect 20: The method of aspect 19, wherein the threshold MCS comprises one of a QPSK modulation or a 16 QAM.

Aspect 21: The method of any of aspects 14 through 20, further comprising: transmitting, to the UE, an association between a set of random access preambles, a set of random access occasions, and a set of reference signal configurations; receiving the random access message from the UE in accordance with a random access preamble via a random access occasion based at least in part on the association; and selecting a reference signal configuration from the set of reference signal configurations based at least in part on the random access preamble and the random access occasion.

Aspect 22: The method of any of aspects 14 through 21, further comprising: receiving an indication of a UE preference for a reference signal configuration for phase tracking based at least in part on the MCS; and selecting the reference signal configuration for a phase tracking reference signal for the UE from a set of reference signal configurations based at least in part on the UE preference.

Aspect 23: A method for wireless communications at a UE, comprising: determining a frequency band available for a random access procedure between the UE and a base station, determining an SCS associated with the frequency band, selecting, from a set of modulation and coding schemes, a modulation and coding scheme for a random access message of the random access procedure based at least in part on the frequency band and the SCS associated with the frequency band, and transmitting the random access message to the base station via a RACH of the frequency band in accordance with the SCS and selected modulation and coding scheme.

Aspect 24: The method of aspect 23, further comprising receiving, from the base station, an indication of the modulation and coding scheme to select from the set of modulation and coding schemes, wherein the modulation and coding scheme is selected based at least in part on the indication.

Aspect 25: The method of aspect 24, wherein receiving the indication comprises receiving an uplink grant that comprises a set of bits for conveying the indication of the modulation and coding scheme, wherein the set of bits comprises at least one reserved bit independent of conveying the indication of the modulation and coding scheme.

Aspect 26: The method of aspect 25, wherein the at least one reserved bit is associated with DMRS multiplexing for the random access message.

Aspect 27: The method of aspect 25, wherein the at least one reserved bit corresponds to a transport block size scaling value for the random access message.

Aspect 28: The method of any one of aspects 23 through 27, further comprising determining a threshold modulation and coding scheme based at least in part on the frequency band and the SCS associated with the frequency band, wherein the selected modulation and coding scheme satisfies the threshold modulation and coding scheme.

Aspect 29: The method of aspect 28, wherein the threshold modulation and coding scheme comprises one of a QPSK modulation or a 16 QAM.

Aspect 30: The method of any one of aspects 23 through 29, further comprising determining a UE preference for a reference signal configuration for phase tracking based at least in part on the selected modulation and coding scheme, and transmitting an indication of the UE preference to the base station.

Aspect 31: The method of aspect 30, further comprising transmitting one or more phase tracking reference signals in accordance with the reference signal configuration, wherein the one or more phase tracking reference signals are transmitted with the random access message.

Aspect 32: The method of any one of aspects 30 through 31, further comprising selecting the modulation and coding scheme based at least in part on the reference signal configuration.

Aspect 33: The method of any one of aspects 30 through 32, further comprising determining a random access preamble and a random access occasion based at least in part on the UE preference for the reference signal configuration.

Aspect 34: The method of aspect 33, further comprising determining an association between a set of random access preambles, a set of random access occasions, and a set of reference signal configurations, and selecting the random access preamble and the random access occasion based at least in part on a second reference signal configuration of the set of reference signal configurations corresponding to the reference signal configuration.

Aspect 35: The method of any one of aspects 1 through 34, further comprising selecting a modulation and coding scheme table from a set of modulation and coding scheme tables based at least in part on the frequency band and the SCS associated with the frequency band, wherein the modulation and coding scheme for the random access message is selected from the modulation and coding scheme table.

Aspect 36: The method of aspect 35, wherein the modulation and coding scheme table comprises a set of MCSs having lower modulation orders relative to all other modulation and coding scheme tables of the set of modulation and coding scheme tables.

Aspect 37: A method for wireless communications at a base station, comprising determining a frequency band available for a random access procedure between the base station and a user equipment (UE), determining an SCS associated with the frequency band, selecting, from a set of modulation and coding schemes, a modulation and coding scheme for a random access message of the random access procedure based at least in part on the frequency band and the SCS associated with the frequency band, and transmitting, to the UE, an indication of the selected modulation and coding scheme for the random access message.

Aspect 38: The method of aspect 37, further comprising receiving, from the UE and in response to the indication of the selected modulation and coding scheme, the random access message via a RACH of the frequency band in accordance with the SCS and selected modulation and coding scheme.

Aspect 39: The method of any one of aspects 37 through 38, wherein transmitting the indication of the selected modulation and coding scheme comprises transmitting an uplink grant that comprises a set of bits for conveying the indication of the modulation and coding scheme, wherein the set of bits comprises at least one reserved bit independent of conveying the indication of the modulation and coding scheme.

Aspect 40: The method of aspect 39, wherein the at least one reserved bit is associated with DMRS multiplexing for the random access message.

Aspect 41: The method of aspect 39, wherein the at least one reserved bit corresponds to a transport block size scaling value for the random access message.

Aspect 42: The method of any one of aspects 37 through 41, further comprising determining a threshold modulation and coding scheme based at least in part on the frequency band and the SCS associated with the frequency band, wherein the selected modulation and coding scheme satisfies the threshold modulation and coding scheme.

Aspect 43: The method of aspect 42, wherein the threshold modulation and coding scheme comprises one of a QPSK modulation or a 16 QAM.

Aspect 44: The method of any one of aspects 37 through 43, further comprising transmitting, to the UE, an association between a set of random access preambles, a set of random access occasions, and a set of reference signal configurations, receiving the random access message from the UE in accordance with a random access preamble via a random access occasion based at least in part on the association, and determining a reference signal configuration of the set of reference signal configurations based at least in part on the random access preamble and the random access occasion.

Aspect 45: The method of any one of aspects 37 through 44, further comprising receiving an indication of a UE preference for a reference signal configuration for phase tracking based at least in part on the selected modulation and coding scheme, and determining the reference signal configuration for a phase tracking reference signal for the UE based at least in part on the UE preference.

Aspect 46: An apparatus for wireless communications at a UE, comprising a processor; memory coupled with the processor; and instructions stored in the memory and executable by the processor to cause the apparatus to perform a method of any of aspects 1 through 13.

Aspect 47: An apparatus for wireless communications at a UE, comprising at least one means for performing a method of any of aspects 1 through 13.

Aspect 48: A non-transitory computer-readable medium storing code for wireless communications at a UE, the code comprising instructions executable by a processor to perform a method of any of aspects 1 through 13.

Aspect 49: An apparatus for wireless communications at a base station, comprising a processor; memory coupled with the processor; and instructions stored in the memory and executable by the processor to cause the apparatus to perform a method of any of aspects 14 through 22.

Aspect 50: An apparatus for wireless communications at a base station, comprising at least one means for performing a method of any of aspects 14 through 22.

Aspect 51: A non-transitory computer-readable medium storing code for wireless communications at a base station, the code comprising instructions executable by a processor to perform a method of any of aspects 14 through 22.

Aspect 52: An apparatus for wireless communications at a donor node in a wireless communications system comprising at least one means for performing a method of any one of examples 23 through 36.

Aspect 53: An apparatus for wireless communications at a donor node in a wireless communications system comprising a processor and memory coupled to the processor, the processor and memory configured to perform a method of any one of examples 23 through 36.

Aspect 54: A non-transitory computer-readable medium storing code for wireless communications at a donor node in a wireless communications system comprising a processor, memory in electronic communication with the processor, and instructions stored in the memory and executable by the processor to cause the apparatus to perform a method of any one of examples 23 through 36.

Aspect 55: An apparatus for wireless communications at a donor node in a wireless communications system comprising at least one means for performing a method of any one of examples 37 through 45.

Aspect 56: An apparatus for wireless communications at a donor node in a wireless communications system comprising a processor and memory coupled to the processor, the processor and memory configured to perform a method of any one of examples 37 through 45.

Aspect 57: A non-transitory computer-readable medium storing code for wireless communications at a donor node in a wireless communications system comprising a processor, memory in electronic communication with the processor, and instructions stored in the memory and executable by the processor to cause the apparatus to perform a method of any one of examples 37 through 45.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE) for wireless communication, comprising:
   a memory; and
   at least one processor coupled to the memory, wherein the UE is configured to:
      receive, in a single uplink grant from a network node and prior to a random access procedure, a set of bits that comprise both an indication of a modulation and coding scheme for a random access message of the random access procedure and at least one reserved bit independent from the indication, wherein the at least one reserved bit corresponds to a transport block size scaling value for the random access message;
      select a modulation and coding scheme table from a set of modulation and coding scheme tables based on a frequency band for the random access procedure and a subcarrier spacing associated with the frequency band, wherein the modulation and coding scheme indicated by the uplink grant is included in the selected modulation and coding scheme table; and
      transmit the random access message to the network node via a random access channel of the frequency band and during the random access procedure in accordance with the subcarrier spacing and the modulation and coding scheme.

2. The UE of claim 1, wherein the modulation and coding scheme table comprises a set of modulation and coding schemes having lower modulation orders relative to other modulation orders of modulation and coding schemes in all other modulation and coding scheme tables of the set of modulation and coding scheme tables.

3. The UE of claim 1, wherein the at least one reserved bit is associated with demodulation reference signal (DMRS) multiplexing for the random access message.

4. The UE of claim 1, wherein the modulation and coding scheme satisfies a threshold modulation and coding scheme that is based on the frequency band and the subcarrier spacing associated with the frequency band.

5. The UE of claim 4, wherein the threshold modulation and coding scheme comprises one of a Quadrature Phase Shift Keying (QPSK) modulation or a 16 Quadrature Amplitude Modulation (QAM).

6. The UE of claim 1, wherein the UE is configured to:
   transmit, to the network node, an indication of a UE preference for a reference signal configuration for phase tracking based on the modulation and coding scheme.

7. The UE of claim 6, wherein the UE is configured to:
   transmit one or more phase tracking reference signals in accordance with the reference signal configuration, wherein the one or more phase tracking reference signals are transmitted with the random access message.

8. The UE of claim 6, wherein the UE is configured to:
   select the reference signal configuration based on the modulation and coding scheme.

9. The UE of claim 6, wherein, to transmit the random access message, the UE is configured to:
   transmit a random access preamble during a random access occasion based on the UE preference for the reference signal configuration.

10. The UE of claim 9, wherein the UE is configured to:
    receive an association between a set of random access preambles, a set of random access occasions, and a set of reference signal configurations; and
    select the random access preamble and the random access occasion based on a second reference signal configuration of the set of reference signal configurations corresponding to the reference signal configuration and the association.

11. The UE of claim 1, further comprising:
    an antenna coupled to the at least one processor.

12. A network node for wireless communication, comprising:
    a memory; and
    at least one processor coupled to the memory, wherein the network node is configured to:
       select a modulation and coding scheme for a random access procedure based on a frequency band for the random access procedure and a subcarrier spacing associated with the frequency band, wherein the modulation and coding scheme is included in a modulation and coding scheme table of a set of modulation and coding scheme tables, wherein each of the set of modulation and coding scheme tables are associated with different frequency bands and subcarrier spacings;
       transmit, in a single uplink grant and prior to the random access procedure, a set of bits that comprise both an indication of the modulation and coding scheme for the random access procedure based on the selection and at least one reserved bit independent from the indication, and wherein the at least one reserved bit corresponds to a transport block size scaling value for a random access message; and
       receive the random access message based on the modulation and coding scheme and during the random access procedure.

13. The network node of claim 12, wherein, to receive the random access message, the network node is configured to:
    receive, in response to the indication of the modulation and coding scheme, the random access message via a random access channel of the frequency band in accordance with the subcarrier spacing and the modulation and coding scheme.

14. The network node of claim 12, wherein the at least one reserved bit is associated with demodulation reference signal (DMRS) multiplexing for the random access message.

15. The network node of claim 12, wherein the modulation and coding scheme satisfies a threshold modulation and coding scheme that is based on the frequency band and the subcarrier spacing associated with the frequency band.

16. The network node of claim 15, wherein the threshold modulation and coding scheme comprises one of a Quadrature Phase Shift Keying (QPSK) modulation or a 16 Quadrature Amplitude Modulation (QAM).

17. The network node of claim 12, wherein the network node is configured to:
- transmit, to a user equipment (UE), an association between a set of random access preambles, a set of random access occasions, and a set of reference signal configurations;
- receive the random access message from the UE in accordance with a random access preamble via a random access occasion based on the association; and
- select a reference signal configuration from the set of reference signal configurations based on the random access preamble and the random access occasion.

18. The network node of claim 12, wherein the network node is configured to:
- receive an indication of a UE preference for a reference signal configuration for phase tracking based on the modulation and coding scheme; and
- select the reference signal configuration for a phase tracking reference signal for a UE from a set of reference signal configurations based on the UE preference.

19. The network node of claim 12, further comprising:
an antenna coupled to the at least one processor.

20. A method of wireless communication performed by a user equipment (UE), comprising:
- receiving, in a single uplink grant from a network node and prior to a random access procedure, a set of bits that comprise both an indication of a modulation and coding scheme for a random access message of the random access procedure and at least one reserved bit independent from the indication, wherein the at least one reserved bit corresponds to a transport block size scaling value for the random access message;
- selecting a modulation and coding scheme table from a set of modulation and coding scheme tables based on a frequency band for the random access procedure and a subcarrier spacing associated with the frequency band, wherein the selected modulation and coding scheme indicated by the uplink grant is included in the selected modulation and coding scheme table; and
- transmitting the random access message to the network node via a random access channel of the frequency band and during the random access procedure in accordance with the subcarrier spacing and the modulation and coding scheme.

21. The method of claim 20, wherein the modulation and coding scheme table comprises a set of modulation and coding schemes having lower modulation orders relative to other modulation orders of modulation and coding schemes in all other modulation and coding scheme tables of the set of modulation and coding scheme tables.

22. A method of wireless communication performed by a network node, comprising:
- selecting a modulation and coding scheme for a random access procedure based on a frequency band for the random access procedure and a subcarrier spacing associated with the frequency band, wherein the modulation and coding scheme is included in a modulation and coding scheme table of a set of modulation and coding scheme tables, wherein each of the set of modulation and coding scheme tables are associated with different frequency bands and subcarrier spacings;
- transmitting, in a single uplink grant and prior to the random access procedure, a set of bits that comprise both an indication of the modulation and coding scheme for the random access procedure based on the selecting and at least one reserved bit independent from the indication, and wherein the at least one reserved bit corresponds to a transport block size scaling value for a random access message; and
- receiving the random access message based on the modulation and coding scheme and during the random access procedure.

23. The method of claim 22, wherein receiving the random access message comprises:
- receiving, in response to the indication of the modulation and coding scheme, the random access message via a random access channel of the frequency band in accordance with the subcarrier spacing and the modulation and coding scheme.

\* \* \* \* \*